United States Patent
Moore et al.

(10) Patent No.: US 11,347,046 B2
(45) Date of Patent: May 31, 2022

(54) COMPUTATIONAL MICROSCOPY BASED-SYSTEM AND METHOD FOR AUTOMATED IMAGING AND ANALYSIS OF PATHOLOGY SPECIMENS

(71) Applicant: Pathware Inc., Seattle, WA (US)

(72) Inventors: Rodger Michael Moore, Seattle, WA (US); Cordero Derrell Core, Birmingham, AL (US); Jaron Nathaniel Nix, Seattle, WA (US); Thomas Karl, Seattle, WA (US); Samatha Hastings, Renton, WA (US); Samir Yhann, Renton, WA (US)

(73) Assignee: Pathware Inc., Seattle, WA (US)

( * ) Notice: Subject to any disclaimer, the term of this patent is extended or adjusted under 35 U.S.C. 154(b) by 0 days.

(21) Appl. No.: 17/415,227

(22) PCT Filed: Dec. 17, 2019

(86) PCT No.: PCT/US2019/066842
§ 371 (c)(1),
(2) Date: Jun. 17, 2021

(87) PCT Pub. No.: WO2020/131864
PCT Pub. Date: Jun. 25, 2020

(65) Prior Publication Data
US 2022/0043251 A1 Feb. 10, 2022

Related U.S. Application Data

(60) Provisional application No. 62/935,599, filed on Nov. 14, 2019, provisional application No. 62/781,271, filed on Dec. 18, 2018.

(51) Int. Cl.
*H04N 7/18* (2006.01)
*G02B 21/36* (2006.01)
(Continued)

(52) U.S. Cl.
CPC .......... *G02B 21/367* (2013.01); *G02B 21/06* (2013.01); *G06V 20/693* (2022.01); *G06V 20/698* (2022.01)

(58) Field of Classification Search
CPC .. G02B 21/367; G02B 21/06; G06K 9/00134; G06K 9/00147
(Continued)

(56) References Cited

U.S. PATENT DOCUMENTS

2013/0223685 A1* 8/2013 Maiden ................. G01T 1/2914
382/103
2014/0118529 A1 5/2014 Zheng et al.
(Continued)

FOREIGN PATENT DOCUMENTS

WO 2017046793 A1 3/2017
WO 2017201334 A1 11/2017
(Continued)

OTHER PUBLICATIONS

Barbastathis et al, ON the use of deep learning of computational imaging (Year: 2019).*
(Continued)

*Primary Examiner* — Shan E Elahi
(74) *Attorney, Agent, or Firm* — Aurora Consulting LLC; Ashley Sloat

(57) ABSTRACT

Described herein are systems and methods for assessing a biological sample. The methods include: characterizing a speckled pattern to be applied by a diffuser; positioning a biological sample relative to at least one coherent light source such that at least one coherent light source illuminates the biological sample; diffusing light produced by the at least one coherent light source; capturing a plurality of illuminated images with the embedded speckle pattern of the biological sample based on the diffused light; iteratively
(Continued)

reconstructing the plurality of speckled illuminated images of the biological sample to recover an image stack of reconstructed images; stitching together each image in the image stack to create a whole slide image, wherein each image of the image stack at least partially overlaps with a neighboring image; and identifying one or more features of the biological sample. The methods may be performed by a near-field Fourier Ptychographic system.

40 Claims, 24 Drawing Sheets

(51) Int. Cl.
  *G02B 21/06* (2006.01)
  *G06V 20/69* (2022.01)
(58) Field of Classification Search
  USPC .......................................................... 348/78
  See application file for complete search history.

(56) References Cited

U.S. PATENT DOCUMENTS

| | | |
|---|---|---|
| 2015/0054979 A1 | 2/2015 | Ou et al. |
| 2016/0088205 A1 | 3/2016 | Horstmeyer et al. |
| 2016/0216503 A1 | 7/2016 | Kim et al. |
| 2016/0266057 A1 | 9/2016 | Dudovich et al. |
| 2016/0266366 A1 | 9/2016 | Chung et al. |
| 2017/0024908 A1* | 1/2017 | Bosch ................ G01N 23/041 |
| 2017/0146788 A1 | 5/2017 | Waller et al. |
| 2017/0235117 A1* | 8/2017 | Putman ............... G02B 21/367 348/49 |
| 2017/0315055 A1 | 11/2017 | Tinnemans et al. |
| 2017/0354329 A1 | 12/2017 | Chung et al. |
| 2018/0048811 A1 | 2/2018 | Waller et al. |
| 2018/0191948 A1 | 7/2018 | Zheng |
| 2018/0231761 A1 | 8/2018 | Dai et al. |
| 2020/0310097 A1 | 10/2020 | Zheng |
| 2020/0310099 A1 | 10/2020 | Zheng |

FOREIGN PATENT DOCUMENTS

| | | |
|---|---|---|
| WO | 2018171381 A1 | 9/2018 |
| WO | 2020131864 A1 | 6/2020 |

OTHER PUBLICATIONS

Li et al., article entitled 'Lensless LED Matrix Ptychographic Microscope: Problems and Solutions,' Applied Optics, 57 (8), p. 1800-1806, Jan. 26, 2018.

Faulkner, et al., article entitled Moveable Aperture Lensless Transmission Microscopy: a Novel Phase Retrieval Algorithm, Physical Review Letters, vol. 93, No. 2, Jul. 9, 2004.

Clare, et al., article entitled 'Characterization of near-field ptychography,' Optics Express, vol. 23, No. 15, p. 1-16, Jul. 2015.

Jiang et al., article entitled 'Wide-field, high-resolution lensless on-chip microscopy via near-field blind ptychographic modulation,' ResearchGate, p. 1-8, Oct. 2019.

Zhang, et al., article entitled 'Field-portable quantitative lensless microscopy based on translated speckle illumination and sub-sampled ptychographic phase retrieval,' Optics Letters, vol. 44, No. 8, p. 1976-1979, Apr. 15, 2019.

Zhang, et al., article entitled 'Near-field Fourier ptychography: super-resolution phase retrieval via speckle illumination,' Optics Express, vol. 27, No. 5, p. 7498-7512, Mar. 4, 2019.

International Search Report dated Feb. 28, 2020, from International Application No. PCT/US2019/066842, 2 pgs.

Written Opinion mailed dated Feb. 28, 2020, from International Application No. PCT/US2019/066842, 6 pgs.

International Search Report dated Feb. 28, 2020 re PCT/US19/66842 (2 pages).

Written Opinion dated Feb. 28, 2020 re PCT/US19/66842 (6 pages).

\* cited by examiner

COMPUTATIONAL MICROSCOPY BASED-SYSTEM AND METHOD FOR AUTOMATED IMAGING AND ANALYSIS OF PATHOLOGY SPECIMENS

CROSS-REFERENCE TO RELATED APPLICATIONS

This application is a 35 U.S.C. §371 U.S. National Stage Application of PCT/US2019/066842 with an international filing date of Dec. 17, 2019; which claims the priority benefit of U.S. Provisional Patent Application Ser. No. 62/781,271, filed Dec. 18, 2018; and U.S. Provisional Patent Application Ser. No. 62/935,599, filed Nov. 14, 2019, the disclosure of each of which is herein incorporated by reference in its entirety.

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of pathology, and more specifically to the field of cytopathology. Described herein are systems and methods for an automated system for the rapid on-site preparation and evaluation of a cytology smear.

BACKGROUND

Microscopic techniques have consistently evolved over time allowing researchers and clinicians to view samples at ever higher magnifications. The most common technique of microscopy is light microscopy, which has served as the cornerstone of most fields of science for centuries. In spite of their popularity, microscopes that utilize this and related techniques are limited by three key factors: the sample must not be translucent, the maximum magnification is limited by the amount of electromagnetic energy collected by the lenses, and the field of view decreases exponentially as magnification increases. Over the years, researchers have employed numerous techniques to address these limitations.

To address the limitations of translucent samples, most samples are stained or tagged with immunohistochemical solutions to highlight molecular characteristics of interest so that they are distinguishable by the human eye. This staining process is most commonly performed by fixing the sample to the slide with an ethanol solution or heat followed by submerging the sample in a series of fluids containing the colorizing solutions that selectively bind to the sample for visualization. This can also be performed through numerous automated approaches such as dripping the stain onto the slide, continuously flowing staining solutions across the slide, embedding or binding the markers to the slide surface, or spraying aerosolized stains onto the slide in a thin layer. Some examples of these staining techniques are Hematoxylin and Eosin, Trichrome, Pap, Romanowsky Stain, and Trypan Blue. Further, all of these stains can be further modified to meet specific user and sample requirements. While these stains allow researchers to easily see the detailed characteristics of a sample, it comes at the cost of sample fixation, meaning the sample is altered and no longer suitable for certain diagnostic tests. Additionally, fixation and staining make point-of-care microscopy applications significantly more challenging as the physician must be properly trained to use the chemical stains to avoid inaccuracies leading to incorrect diagnoses. To address these challenges, optical engineers have developed specialized Phase Contrast microscopes that are able to capture both light and dark field light information to immediately create a phase contrast image of a sample. This technique enables scientists to view translucent samples (e.g., live cell cultures) without fixing, staining, or altering the sample. While Phase Contrast enables numerous applications for rapid interpretation of samples at the point-of-care, the resulting images are limited in application due to the lack of molecular detail provided compared to the physical stain, and the limited field of view requires the operator to search through the sample for key regions of interest.

Another limitation of existing microscopes is the diminished light available as the field of view is restricted. As researchers have continued to reach higher magnifications, lenses have been modified to maximize the amount of light collected. Backlit and inverted microscopes position the illumination source and the lenses to enable the operator to view beyond four hundred times the magnification of the human eye. As microscopes approach one thousand times magnification (100× objective lens), the amount of light available is diminished to where the operator will no longer be able to view the sample. By immersing the lens in an oil mixture that is contiguous with the sample, the operator is able to increase the amount of light passing through the lens to continue to reach higher magnifications of up to 2000×. This is possible because the oil will decrease the amount of light that refracts away from the objective lens to maximize the light collected from a given point. To visualize a sample beyond 2000×, microscopes employ numerous techniques to increase the intensity of the electromagnetic wave passing through the sample and measure the resulting waves with finely tuned sensors. The measurements can be used to computationally reconstruct the simulated microscopic environment for further analysis. One example is Raman Spectroscopy where a monochromatic light is channeled through a sample. As the light inelastically scatters in the sample, molecular vibrations shift the energy of the photons creating a signal that can be differentiated by complex models to reconstruct the microscopic environment. Similarly, scanning electron microscopes pass a focused beam of electrons through a sample of interest. The atomic interactions are detected by specialized sensors to reconstruct the topography and composition of the sample. One of the primary limitations of both of these techniques is the damage caused to the sample by the high intensity waves. Additionally, both techniques require the sample to be extensively prepared prior to imaging, which limits any future uses of the sample. Lastly, these magnifications return an infinitesimally small field of view which is difficult to generalize to typical samples that cover an area of 15 millimeters by 15 millimeters.

Accordingly, there is a need for improved systems and methods for automated microscopic imaging and analysis of specimens.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

FIG. 2 shows one embodiment of a fluid filled receptacle containing a sample being imaged by the system of FIG. 1.

FIG. 3 shows a biological sample, mounted via smearing or sectioning, being imaged by the system of FIG. 1.

FIG. 4 shows one embodiment of a microfluidic device being imaged by the system of FIG. 1.

FIG. 8 shows a partially exploded view of the device for analyzing a sample. FIG. 9 shows a sample insertion window of the device of FIG. 8. FIG. 10 shows the holder of FIGS. 6-7 being inserted into a motorized X-Y stage of the device of FIG. 8. FIG. 11 shows an imager of the device of FIG. 8 relative to a sample and stage.

FIG. 13 shows schematically a random illumination sequence. FIG. 14 shows schematically a raster illumination sequence. FIG. 15 shows schematically a spiral illumination sequence. FIG. 16 shows schematically a numerical aperture of an optical system for illuminating a sample.

FIG. 17 is a generalized schematic of a Far-field Fourier ptychography system. FIG. 18 shows one embodiment of an illumination source for the system of FIG. 17. FIG. 19 shows optical stack components of one embodiment of FIG. 17.

FIG. 20 shows one embodiment of a Near-field Fourier ptychography system. FIG. 21 shows another embodiment of a Near-field Fourier ptychography system. FIG. 22 shows another embodiment of a Near-field Fourier ptychography system.

Figure 1:
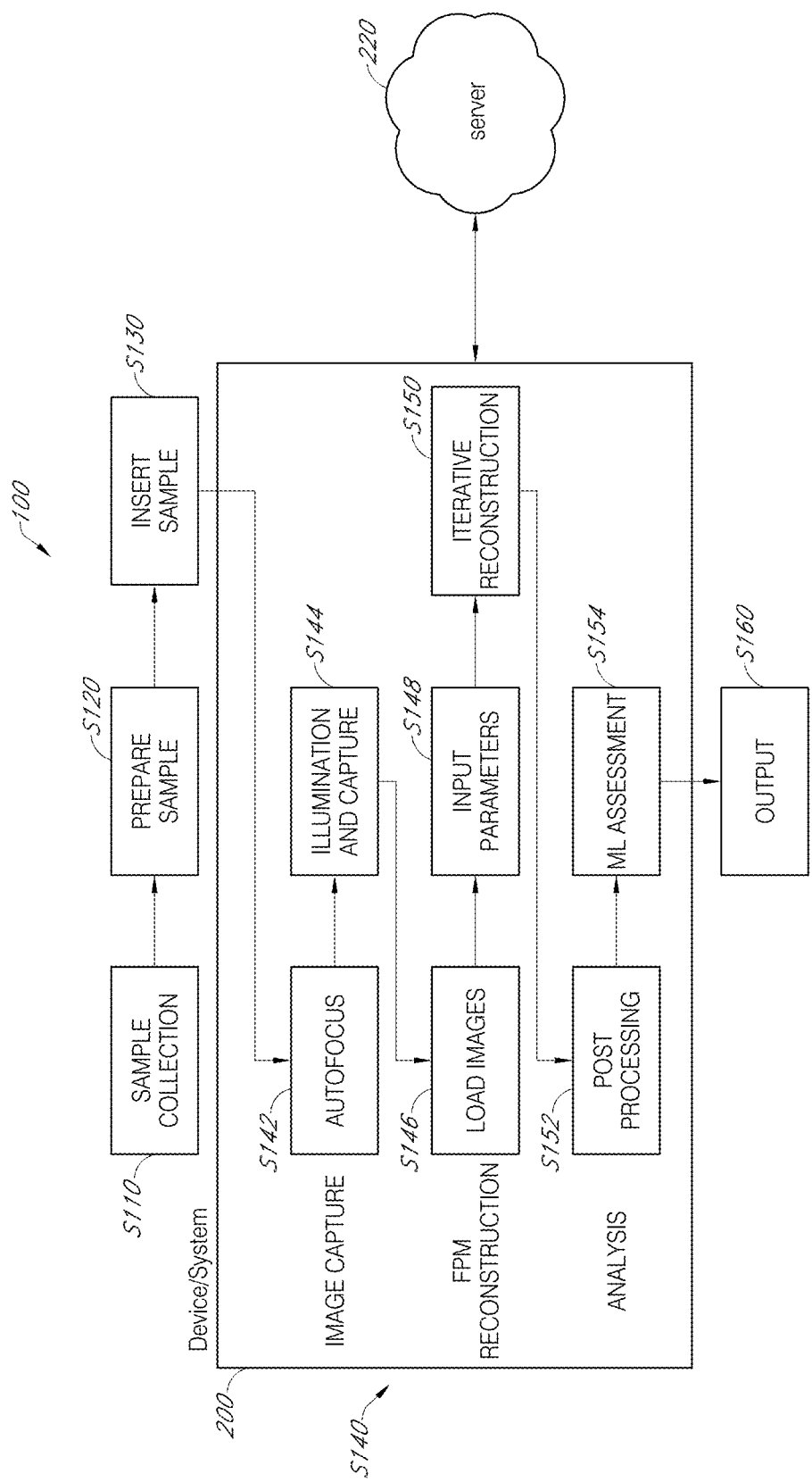
FIG. 1 shows a flow diagram of an embodiment of a system for automated sample analysis.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

As noted above, various types of microscopic imaging have been used to allow researchers and clinicians to view samples at various magnifications. Regardless of the imaging technique employed, there is a clear inverse relationship between the magnification and the resulting field of view. Because most diagnostic work is performed at 200-400 times magnification, the operator is only viewing a diameter of 0.075 millimeters, which is less than 1/100,000th of the total slide area at any given time. Accordingly, it is fundamentally impossible for a pathologist to inspect all aspects of a given sample. This limitation leads them to observe smaller regions of interest and approximate the contents of the rest of the sample. The subjectivity of what qualifies as a region of interest leads to well documented issues with concordance between physicians and even the same physician on different days. There are now whole slide imaging systems available in the market that obviate this limitation by connecting the illumination source and image capture module to a motorized/digital system to capture sequential images of the sample and stitch each image into a chain until the field of view matches the surface of the slide. This approach has allowed dozens of companies to begin developing computational image analysis techniques that support the operator in identifying regions of interest and in some cases making diagnoses. This automated approach is a massive improvement over manual image analysis techniques as the system can consider the entire sample as a single field of view without having to sacrifice the high magnification output. Beyond the expansive field of view, digitized slides are easily transferred between individuals and can be stored indefinitely for later clinical review or research applications. Additionally, it is reasonable to expect that these digital images will be integrated with information in the electronic health record for development of predictive and diagnostic machine learning models. However, whole slide imaging systems do encounter challenges when there is any deviation from the norm.

Being that most samples are fixed and stained, all commercially available slide scanners utilize confocal microscopy and/or fluorescence microscopy meaning that the samples must go through multiple steps of preparation and manipulation prior to imaging It is not unreasonable to believe that other systems use Phase Contrast microscopes, but the resulting diagnostic utility would be hindered. Further, this technique is limited when there is any variance in the focal plane resulting in choppy images and images that are largely out of focus. This is especially pronounced with cytology samples that are smeared across a slide (i.e., the sample is non-uniform in thickness). This is in comparison to histology where samples are uniformly sliced out of a paraffin wax mold prior to mounting on a slide (i.e., the sample has a substantially uniform thickness). This smearing technique results in significant variance in the z-axis resulting in 40% of scanned slides needing to be repeated. Newer systems will work around this limitation by using a technique called z-stacking where the system will capture images at multiple heights to select the image that is in focus. It is also known in the art that a system can illuminate the sample with one or more defined incidences of light to determine how out of focus an image is at a given height. The system can either adjust the height of the image capture module to match the focal plane, or it can utilize software to correct for the focal difference. For a more manual solution to the z-axis variation, it is known in the art that a fluidic cytology sample can be inserted into a vial containing an ethanol fixative and aspirated out of the vial onto a thin filter. This filter can then be compressed onto the surface of a glass slide in a single layer for imaging along one focal plane. This technique is able to resolve the focal differences but requires multiple preparation steps that significantly increase the cost and complexity of a procedure. Lastly, all of these whole slide imaging systems tend to be bulky, expensive, and time intensive due to the finely tuned motor systems and image sensors that are required to consistently image at such high magnifications across a large surface area. Philips' Ultra-Fast Scanner is the current standard in the space. However, it has not seen significant commercial success due to its weight being more than 130 kg, scan times upwards of five minutes per sample, and regulatory bodies expressly limiting use cases to only histology samples due to the challenges in accounting for z-axis variance.

The inventors have recognized that the combination of these challenges make it difficult to integrate automated pathology solutions for point-of-care applications. One such application would be in the visualization and verification of biopsy samples at the time of extraction. Biopsies are commonly performed in medical procedures that remove tissue from a patient by a clinician or surgeon for analysis by a pathologist. Hospitals are typically under-reimbursed for this procedure due to the frequent need to repeat it to obtain a sample large enough to determine a diagnosis. In fact, one in five biopsies taken in the U.S. fail to return a diagnosis. To address this challenge, hospitals have developed a protocol for on-site (i.e., in the operating room) assessment of the biopsy to ensure that a sufficiently large sample was collected. Rapid on-site evaluation (ROSE) is a technique used in clinical medicine to help validate the adequacy of tissue biopsies at the point-of-care. It is primarily used for fine needle aspiration (FNA) procedures and has been used for various tissues and with different stains. The value hospitals find with implementing ROSE is in reducing failed procedure rates. However, others argue that using a pathologist's time for ROSE instead of in the lab looking at case samples represents a significant drawback to the technique.

One example of current practice with ROSE is with thyroid cancer biopsies. The procedure is performed in a clinical setting, and the sample is read by either a cytotechnologist or cytopathologist. This process includes smearing a volume of about 50 microliters of sample from the FNA onto a regular glass slide for standard light microscopy evaluation. If, under microscopy, six groups of ten cells with nuclei are seen, then the FNA is considered successful and the rest of the sample is sent to the pathology lab for secondary testing and diagnosis. If viewing under microscopy indicates the sample is not adequate (e.g., anything less than 6 groups of 10 cells), then another sample is retrieved. Constructing a way that allows for the technique to be performed but without the loss of reimbursement on the pathologists' end would be highly valuable, especially for healthcare providers who might not have complete proficiency with a particular biopsy procedure.

There is a clear need in the market for a device that is able to address the core challenges of microscopy by providing a wide field of view at a high magnification, visualizing translucent samples, and imaging across a plurality of focal planes. Such a system could be used to produce images of both histology and cytology samples prepared on a slide, on a plate, in a vial, in a microfluidic chamber, and in a fluidic medium. For any point-of-care applications, such a system may have a minimal footprint, rest on a countertop or mobile station, and return immediate results to guide clinical decision making.

Disclosed herein are such systems, methods, and devices for use in expediting and optimizing specimen preparation and assessment for microscopic evaluation. As will be described, such an assessment may be performed using one or more system or methods configured to obtain a high magnification whole slide image using, for example, Fourier ptychography.

FIG. 1 shows a method that may be implemented in one or more devices or systems described herein. For example, FIG. 1 shows a flow diagram of one embodiment of a method 100 for automated sample analysis. The steps described within this method may be embodied in one or more devices. For example, sample preparation, image capture, quantitative phase image capture, super-resolution image reconstruction, and data analysis may be embodied in a single device or in more than one device. As shown in FIG. 1, the method 100 may include the steps of collecting a sample S110, preparing the sample for evaluation S120, inserting the sample into a device arranged to analyze the sample S130, analyzing the sample S140, and outputting a message S160. As will be described, the message may include an indication of sample adequacy, quality, type (e.g., cell type, bodily location, etc.), disease state, etc.

A sample may comprise any material and be prepared by any method known to one of skill in the art. Samples indicated for microscopic analysis may be obtained from plant, human, veterinary, bacterial, fungal, or water sources. Cellular specimens may be cytological or histological (e.g., touch prep, FNA, frozen section, core needle, washing/body fluid, Mohs, excisional biopsy, shavings, scrapings, etc.). Bodily fluids and other materials (e.g., blood, joint aspirate, urine, semen, fecal matter, interstitial fluid, etc.) may also be analyzed using the systems and devices described herein. Specimens may be collected and processed prior to analysis (e.g., stained or unstained, embedded in wax, fixed or unfixed, in solution (e.g., including thinprep, sureprep, microfluidics, flow cytometry, etc.), immunohistochemically-tagged or untagged, with or without coverslip, or prepared in any other manner known to one of skill in the art). Exemplary, non-limiting sample types or materials that may be collected at step S110 include blood, urine, interstitial fluid, joint aspirate, semen, tissue, saliva, sweat, lavage fluid, amniotic fluid, and/or fecal matter, from mammals, plants, microorganisms, eukaryotes, and/or prokaryotes.

As illustrated in FIG. 1, after collecting the sample, the sample may be prepared (see block S120). In some embodiments, preparation of the sample may include fresh (i.e., recently collected), frozen, unstained, stained, sectioned, smeared, fixed, unfixed, etc. by any methods known to one of skill in the art.

Figure 2:
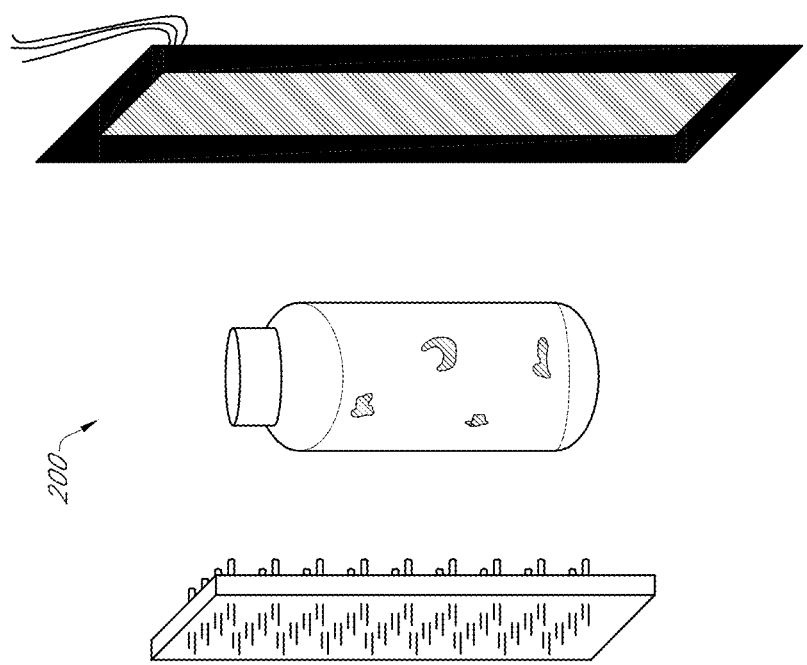
FIGS. 2-4 illustrate various formats of samples that may be imaged and analyzed by the systems of FIG. 1.
Figure 3:
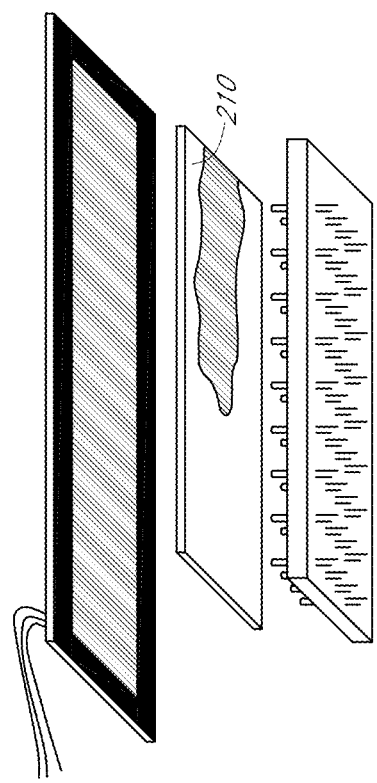
Figure 4:
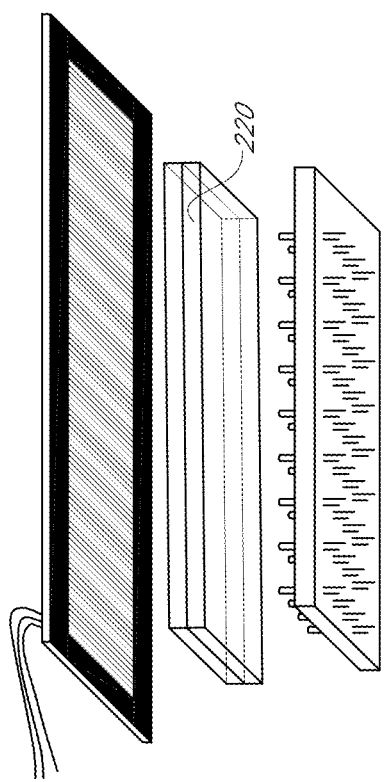

In some embodiments, the sample may be applied to, contained in, or otherwise used in any device, receptacle, or means for analysis by any of the systems, devices, or methods described herein. For example, FIGS. 2-4 show various types of receptacles that may contain, house, hold, carry, or otherwise be configured to receive a sample for analysis by any of the devices and systems described elsewhere herein. FIG. 2 shows a receptacle, tube, or container 200 configured to contain a sample therein. For example, the receptacle may be a test tube, bottle, cup, or other similar container. FIG. 3 shows a slide 210 with a sample applied thereon, for example smeared on the slide. Such a slide 200 may be inserted into or placed under, on top of, or into a device or system for analyzing a sample (see, e.g., block S130 in FIG. 1).

FIG. 4 shows another embodiment of a receptacle for holding a sample, for example a microfluidic device 220. In some embodiments, a microfluidic device 220 may include one or more channels therein to hold, house, or otherwise contain the sample. The chip channel may define a volume of 50 microliters, for example, between its top and bottom plates. The shape of its top plate may be concave to allow for gas within the circuit to raise over to the sides and corners of the chip for clear imaging of a majority of the internal compartment. The opposing side has an opening to the internal compartment sealed with a one-way, gas-permeable filter for even filling fluid flow. The sample may be applied to the microfluidic device manually using, for example a pipette, or automatically using, for example a robotic assembly. In some embodiments, one or more sidewalls or surfaces of a microfluidic device may include coatings, tags, antibodies, stains, or the like configured to interact with the sample therein and either label the sample or isolate various components from the sample.

In some embodiments, a sample is applied to a receptacle (e.g., smeared onto a slide, injected into a receptacle, etc.), prepared (e.g., stained, tagged, purified, left unstained, etc.), and inserted into a device for analysis. In other embodiments, the sample is prepared (e.g., stained, tagged, purified, etc.) before applying to a receptacle and inserting into a device for analysis. In still other embodiments, the sample is applied to a device for analysis and the device then functions to prepare the sample, apply it to a receptacle, and/or analyze the sample.

As illustrated in FIG. 1, the sample may be inserted S130 into any of the devices or systems described herein. In some embodiments, one or more of the receptacles containing a sample described herein may be labeled with an identifier. For example, one or more receptacles may be labeled for identification and/or alignment in any of the devices and systems described herein. Exemplary, non-limiting embodiments of an identifier include a barcode, a QR code, an etched pattern, a label, or any other identifier known in the art.

As will be appreciated, each of the receptacles need not include an identifier in all embodiments. As will be further appreciated, one or more of the receptacles may include the same identifier, or at least a portion of the identifier. For example, in some embodiments, one or more receptacles may include samples from the same patient, with the receptacles including the same patient identifier (e.g., patient number).

Figure 5:
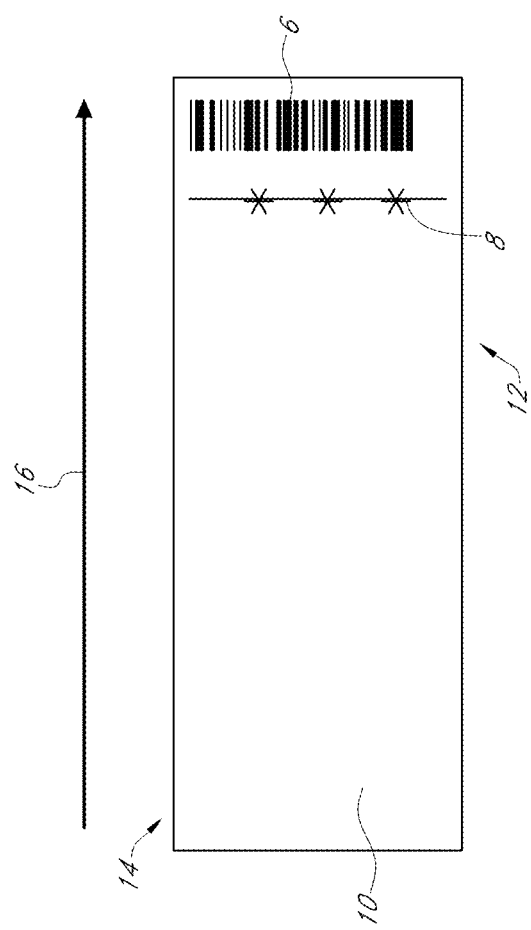
FIG. 5 shows a top view of a device for aligning and/or identifying a biological sample in a system for analysis.

The identifier may be located on any suitable portion of the receptacle. In some embodiments, as shown in FIG. 5, at least one side of the receptacle may include an identifier. In such embodiments, the at least one side of the receptacle may correspond to the side of the receptacle that is adjacent to/faces a reader in the device. For example, in some embodiments, when the receptacle is inserted into the device for analysis, the device may read the identifier and determine one or more attributes associated with the receptacle. Exemplary, non-limiting examples of attributes include origin of sample, type of sample, orientation of sample, preparation of sample, date and/or time of sample collection, date and/or time of sample preparation, date and/or time of sample arrival, manufacturing date of the receptacle, expiration date of the receptacle, and/or patient information.

In some embodiments, the receptacle may include more than one identifier. For example, the receptacle may include a second identifier to align the receptacle in the device or system and/or to guide a camera in the device or system during each imaging cycle. In some embodiments, the second identifier may include an etched pattern, groove, symbol, or other marking. In some embodiments, the first and second identifiers may be located on the same side of the receptacle. In other embodiments, the first and second identifiers may be located on different sides of the receptacle.

In an illustrative embodiment where the receptacle includes a slide, as shown in FIG. 5, a first identifier may include an etched pattern 8 that extends along a first surface of the slide 10, from a first edge 12 of the slide to a second edge 14 of the slide 10, the first edge 12 being opposite the second edge 14. In this embodiment, the second identifier 6 may include a barcode. In some embodiments, the second identifier 6 also may extend along the first surface, between the first 12 and second 14 edges of the slide 10.

Although the first and second identifiers are shown as extending from the first edge of the slide to the second edge of the side, in other embodiments, one or both identifiers may extend only partially along the first side of the slide, between the first and second edges. For example, a first identifier may extend along between about 25% and about 75% of a length of the side of the slide. In some examples, the first identifier may be centered along a length of the side of the slide. As will be appreciated, the first and second identifiers need not be the same length. For example, the first identifier may be longer than the second identifier. The first and second identifiers also need not be vertically aligned on the side of the slide. For example, a first identifier may be located near the first edge of the slide while the second identifier is located near the second edge of the slide. In some embodiments, the identifiers may be horizontally aligned (e.g., in the same row).

In some embodiments, as the receptacle is moved along the x-axis (see the arrow labeled 16 in FIG. 5) for insertion into any of the devices and systems shown and described herein, the second identifier 6 may be read by the system or device for identification of the slide 10 or sample. The first identifier 8 may then be read for alignment of the slide 10 or sample. Although the identifiers are described as being read sequentially in this embodiment, in other embodiments, the first and second identifiers 6, 8 may be read at the same time. In other embodiments, the receptacle may include only one identifier for alignment or one identifier for identification. In some embodiments, the receptacle may include a single identifier for both alignment and identification.

Figure 7:
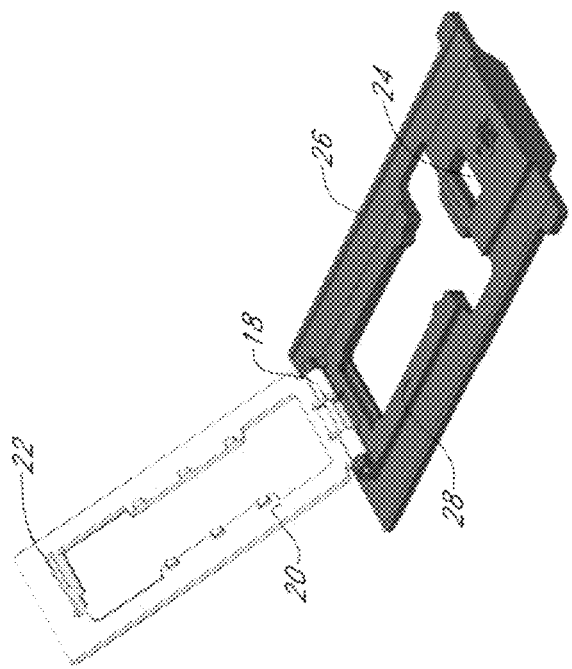
FIG. 7 shows a perspective view of an embodiment of a sample holder with a hinged door in an open configuration.
Figure 6:
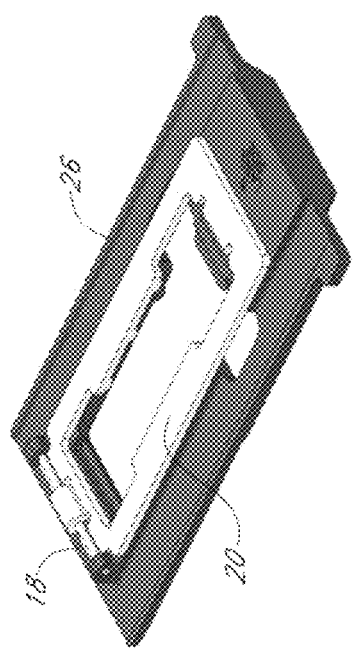
FIG. 6 shows a perspective view of an embodiment of a sample holder with a hinged door in a closed configuration.

In some embodiments, the sample may be directly inserted into any of the devices or systems described elsewhere herein. In some embodiments, the sample may be inserted into a sample receiver, sample holder, receptacle, and/or container, which is configured to be received by a device or system for analysis of the sample therein (see, e.g., FIGS. 10 and 11). In some embodiments, as shown in FIG. 6, the sample may be inserted into a sample holder prior to insertion into the device. In some embodiments, the holder may be configured to maintain the sample substantially flat or planar relative to the camera and/or sensor during the imaging process. In some embodiments, the holder may include one or more retainers to hold the sample in the holder. For example, as shown in FIGS. 6-7, the retainer may include a door or flap 20, which is configured to move between a closed or clamped configuration, as shown in FIG. 6, in which the sample is secured therein and an open or unclamped configuration, as shown in FIG. 7, in which the sample is movable within or from the sample holder. As shown in FIGS. 6-7, the door 20 may be hingedly connected to the holder (e.g., see hinge 18) such that the door may pivot between the open (FIG. 7) and closed (FIG. 6) positions. Door 20 may include latch 22 comprising one or more protrusions or bevels insertable into aperture 24 defined by a bottom portion 26 of the holder. Bottom portion 26 may further define one or more rails or grooves 28 configured to slidably receive and secure a slide therein.

As will be appreciated, the sample holder may hold the sample in other suitable manners. For example, the sample holder may include one or more fasteners arranged to hold the sample on or in the holder. The sample holder also may include one or more channels into which the sample (e.g., slide) may be slidably inserted or snapped into the sample holder. Alternatively, in some embodiments, a sample is inserted into a device or system for analysis without a sample holder, for example such that the device or system for analysis includes therein a mechanism for holding, restraining, or containing the sample.

As illustrated in FIG. 1, once the sample is inserted into a device or system (see block S130), the sample may be analyzed (see block S140). In some embodiments, analysis may include one or more of autofocusing or defocusing on the sample S142, illuminating the sample and capturing one or more images of the sample S144, loading the one or more images S146, receiving one or more input parameters S148, iteratively reconstructing the one or more images into a high resolution image S150, post-processing S152 (e.g., image stitching), and assessing the sample using feature extraction and/or one or more machine and/or deep learning models S154. In some embodiments, a deep learning model may be used to apply a digital stain to high resolution quantitative phase images.

In some embodiments, the method also includes outputting one or more messages (see block S160) about the analysis of the sample. In some embodiments, the device may physically tag the slide to denote identifying characteristics and/or assessment outcomes of the sample for slide management purposes, such as via laser etching and photosensitive materials.

The various analysis steps described above may be performed by any of the devices and systems described herein. For example, as shown in FIGS. 8-11, a system may include a self-contained computational microscope. In some embodiments, the system may optionally include an embedded user interface. In some embodiments the system may also optionally include a server 220, such as that shown in FIG. 1. Data acquired using one or more devices or systems described herein or analyses performed using one or more devices or systems herein may be transmitted to and/or stored in server 220. In some embodiments, such data and/or analyses may be used to form a database of sample types and their associated analyses, conditions (e.g., health state, disease type, etc.), demographics (e.g. age, sex, etc.), past medical history (e.g., prior surgeries, disease history, etc.) to, for example, train machine learning or deep learning models to detect certain types of conditions, sample types, etc. or as a learning resource for physicians, students, etc. Alternatively or additionally, server 220 may function to receive data and/or analyses from one or more systems described herein and output an indication (e.g., disease state, sample type, etc.) or update or sync with an electronic health record of a patient.

In some embodiments, the system may include unidirectional or bi-directional communication between a server or cloud service 220 and one or more devices or systems 200 for analysis described herein. In some embodiments, the communication between the system/device 200 and a server 220 may be wireless using Bluetooth, low energy Bluetooth, near-field communication, infrared, WLAN, Wi-Fi, CDMA, LTE, other cellular protocol, other radiofrequency, or another wireless protocol. Additionally or alternatively, sending or transmitting information between the system/device 200 and a server 220 may occur via a wired connection such as IEEE 1394, Thunderbolt, Lightning, DVI, HDMI, Serial, Universal Serial Bus, Parallel, Ethernet, Coaxial, VGA, PS/2, or other wired connection.

Figure 8:
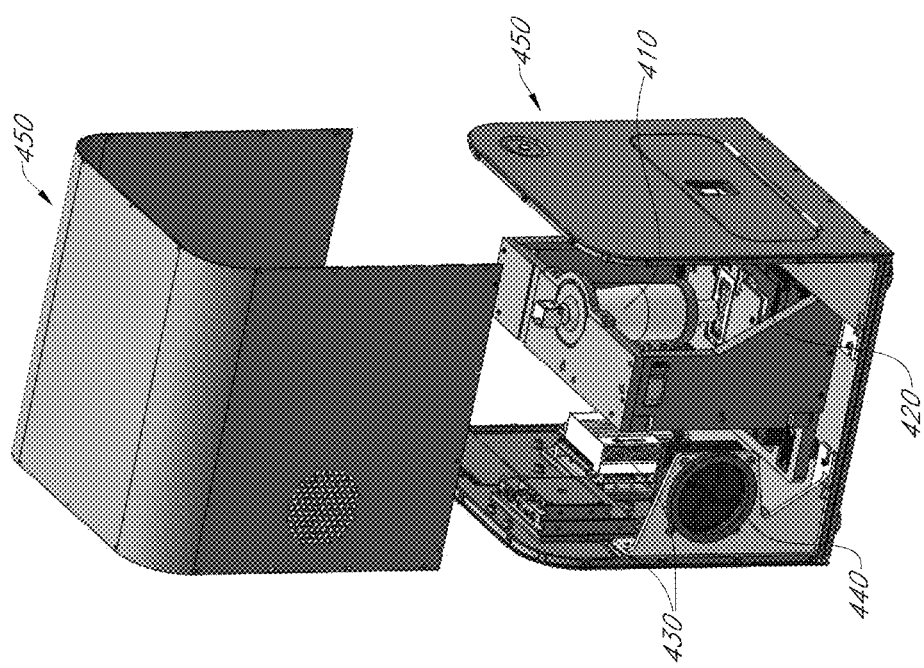
FIGS. 8-11 show various aspects of one embodiment of a device for analyzing a sample.
Figure 9:
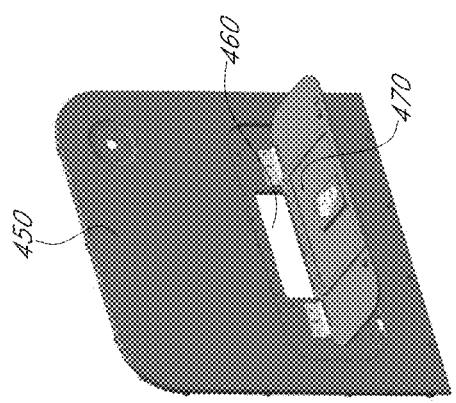

In some embodiments, a prepared sample may be imaged for analysis using an automated digital microscopy platform, an example of which is shown in FIGS. 8-11. A side, partially exploded view of such a platform is shown in FIG. 8. The automated microscopy platform may contain an imager 410 (e.g., illumination source, with or without a lens, and a sensor), a motorized stage X-Y and Z stage 420, one or more processors 430, a cooling apparatus 440, and a housing 450. In some embodiments, the housing 450 may be configured to reduce light pollution from the environment during sample analysis. A sample may be inserted into the unit through an aperture 460 in a first side of the housing 450, as shown in FIG. 9. In some embodiments, as shown in FIG. 9, the aperture may include a wall 470, which is coupled to the housing 450 and movable between an open configuration in which aperture 460 is accessible (e.g., to receive the sample), and a closed configuration in which aperture 460 is not accessible. In some embodiments, the aperture 460 may be closed during sample analysis so that a user may not insert another sample or try to remove the sample being analyzed. In some embodiments, wall 470 may be coupled to housing 450 via a hinge mechanism (e.g., butt hinge, barrel hinge, piano hinge, butterfly hinge, flush hinge, spring hinge, etc.) or via any other mechanism known in the art. A sample may be manually or automatically inserted into the device of FIG. 8 via aperture 460 defined by housing 450 in FIG. 9.

Figure 10:
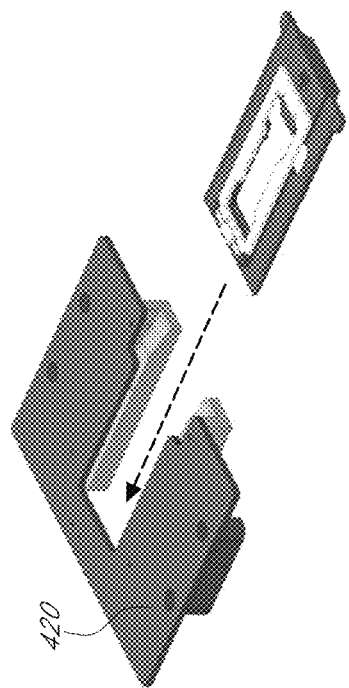
Figure 11:
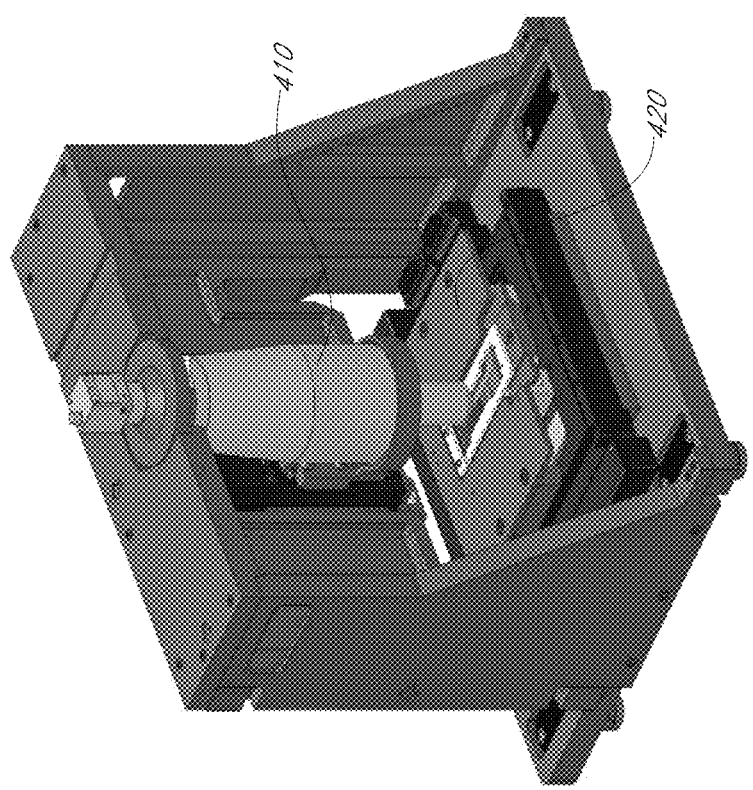

In some embodiments, as shown in FIG. 10, platform or stage 420 (e.g., movable in x, y directions during imaging) may include one or more rails or grooves configured to slidably receive a sample therein, for example the sample being preloaded, as shown in FIG. 6. In some embodiments, the X-Y and Z stages 420 may mechanically position the sample for imaging in platforms with stationary imager 410, shown in FIG. 11. In some embodiments, the imager 410 of the assembly may optionally include one or more of the following features: 2x-100x objective lens, tube lens, an illumination array (e.g., comprising one or more LEDs), and a sensor (e.g., monochromatic CMOS). The device may also include more than one integrated lens and/or sensors for imaging the sample. With regard to the optical system, in some instances, a combination of visible and/or non-visible electromagnetic radiation may pass through one or more objective lenses, one or more tube lenses, one or more camera lenses, and/or no lenses. In some instances, the lighting apparatus may include an LED array or microarray in one or more planes arranged in a periodic and/or non-periodic orientation, OLED displays, LCD displays, MicroLEDs, single-mode-fiber-coupled lasers, laser diodes, Perovskite, one or more galvanometers/reflecting mediums, wavelength filters, and/or beam splitters. In some embodiments, the imager includes a charge coupled device (CCD), a complementary metal-oxide-semiconductor (CMOS), lens, light-emitting diode (LED) board, and/or other image capture sensor or module.

In some embodiments, autofocusing techniques may be used to account for variance in the Z-axis. For example, a combination of the illumination and sensor components could move into place on one or both sides of the sample to generate an autofocus map (see, FIG. 1 at block S142) across the sample using visible and/or non-visible electromagnetic radiation to assess the focus distance of the projected images. A variety of autofocusing methods also may be employed including variance of the Laplacian, threshold absolute gradient, and other methodologies known to one skilled in the art.

Figure 32:
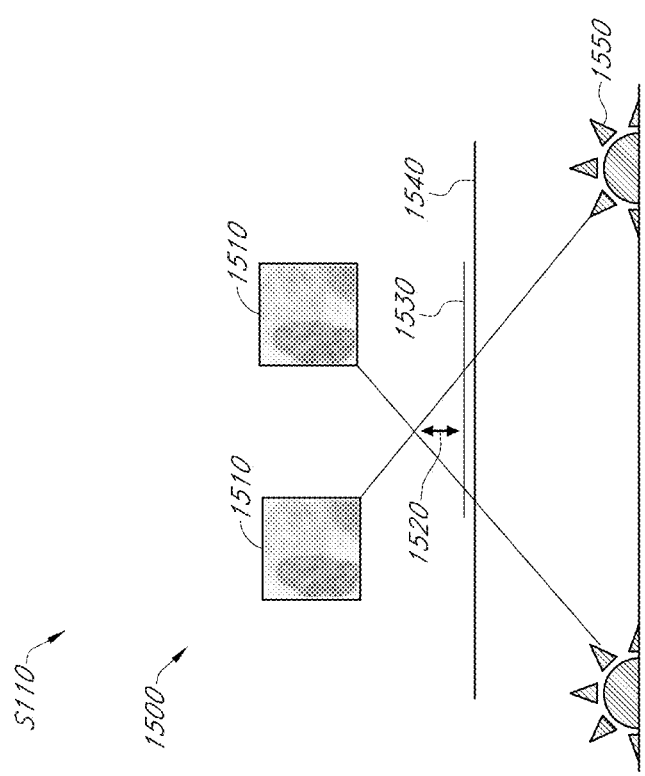
FIG. 32 illustrates one embodiment of a method of autofocusing for ptychographic systems.

In another embodiment shown in FIG. 32, during autofocusing, a sample 1530 may be illuminated using one or more light sources 1550 (one or more wavelengths) to determine the optical focal plane (for Far-Field Fourier Ptychography) or defocus distance (for near-field Fourier Ptychography) and optimal distance 1520 of a stage 1540 along a z-axis. Out of focus images 1510 may be generated until the optimal distance 1520 of z-stage 1540 is determined or set. For example, the sample 1530 may be moved to a predefined offset position (z-offset) to generate out-of-focus contrast using the partially coherent LED illumination and facilitate the autocorrelation analysis of the focus point. In some embodiments, an offset distance may be set to between about 10-1000 µm (e.g., 60 µm). In some embodiments the defocus distance may be configured based on the offset distance. For example, if an offset distance is set at about 60 µm, a sample position from −30 µm to +30 µm can be detected (i.e., the range from 30 µm to 90 µm).

In some embodiments, a method for imaging may further comprise one or more steps for powering on and/or off one or more illumination sources. In an exemplary embodiment, a set of white LEDs may be powered off while a set (e.g., set of 2, 4, 6, 8, 10, greater than 10, etc.) of green LEDs are turned on. In some embodiments, the green LEDs may be positioned oblique to the sample, although the green LEDs also may have other suitable arrangements. In some embodiments, the method may comprise a step for positioning the sample at a defocused position such that the captured image from the main camera includes two copies of the sample separated by a defined distance such that this distance can be used to recover the focus plane of the sample. The system may then perform the step of scanning the sample perpendicular to a plane defined by the two LED illumination.

In some instances, the method may comprise initiating movement of the camera and lighting apparatus for sample illumination and image capture, as shown in FIG. 1 at block S144. In some instances, a plurality of images may be captured from a variety of illumination conditions to collect phase and intensity data for images. In some embodiments, the total number of the plurality of different illumination conditions is between about 2 to 10, between about 5 to 50, between about 10 to 100, between about 50 to 1000, or more than 1000. In some embodiments, the plurality of images may be captured with an image sensor that may be monochromatic with 18 fps, 20.48 MP, global shutter, and 2.4 µm-square unit pixel size. In other embodiments, the image sensor may use focal-plane, simple leaf, rolling, diaphragm, central, or electronic shutter, total sensor pixels either fewer or greater than 20 MP, varying frame rates as low as 1 fps or greater than 18 fps, a pixel size greater or smaller than 2.4 µm/pixel, or non-square pixels. In some embodiments, the resulting pixel size of the image stack may be between 1.7 microns per pixel to 0.250 microns per pixel after the objective lens and before ptychographic reconstruction. In further instances, initiating movement may comprise receiving a user input (e.g., selection of a button) or transmitting a command to device 200 in FIG. 1 to initiate camera, lighting apparatus, and/or sample movement.

As illustrated by FIG. 1. one or more images captured at block S144 may be preprocessed using various imaging enhancement techniques disclosed herein, loaded (e.g., from files where they may be held in memory or saved as BMP, JPEG, PNG, etc.) at block S146, and used to create one or more quantitative phase and/or high-resolution images at block S150.

In some embodiments, phase contrast images, quantitative phase images (QPIs), and/or super-resolution images may be obtained through application of computational microscopy to one or more images obtained under one or more lighting conditions. For purposes herein, QPI refers to a set of microscopy techniques wherein the differential phase shift of an object is quantified as light waves pass through the more optically dense object. In the case of biological applications, translucent objects, such as cells, absorb and scatter small amounts of light. Resultantly, this makes translucent objects difficult to observe under traditional brightfield conditions. However, such objects do induce a phase shift that can be observed using QPI. As opposed to conventional phase contrast microscopy techniques which visualize phase shifts by transforming phase shift gradients into intensity variations which result in difficult to extract quantitative information, QPI creates a secondary phase shift image, independent of the intensity (brightfield) image. Phase unwrapping methods are generally applied to the phase shift image to give absolute phase shift values in each pixel. The principal methods for measuring and visualizing phase shifts include, but are not limited to, ptychography and various types of holographic microscopy methods such as digital holographic microscopy, holographic interference microscopy, and digital in-line holographic microscopy. Common to these methods is that an interference pattern (hologram) is recorded by a digital image sensor. From the recorded interference pattern, the intensity and the phase shift image may be numerically created by a computer algorithm.

In some embodiments, sample illumination and image capture at block S144 in FIG. 1 also includes obtaining QPIs via Fourier Ptychography. In some embodiments, an array of light sources or diffracted/reflected light may be used for illuminating the sample from different incident angles and acquiring corresponding low-resolution images using a monochromatic camera. In some exemplary embodiments, light sources may be lit up simultaneously for information multiplexing, and the acquired images thus represent incoherent summations of the sample transmission profiles corresponding to different coherent states. In other embodiments, light sources may be lit up with specific patterns and/or at different frequencies. For example, as shown in FIGS. 13-16, various lighting configurations may be used in Far-Field Fourier Ptychography including, but not limited to, random (FIG. 13), raster (FIG. 14), spiral (FIG. 15), numerical aperture of illumination (FIG. 16), and computationally derived sequencing, where each numerically labeled circle denotes a light source in FIGS. 13-16. In further embodiments, the different patterns or frequencies of illuminating the sample may be related to the wavelength of light used to illuminate the sample or the placement of the light source (e.g., distance from sample, angle of rotation, etc.) from the sample. In additional non-limiting embodiments, the different patterns of illumination, frequency of illumination, and/or wavelength of illumination may be determined by the system based on one or more pieces of information collected about the sample, such as via information contained in an identifier on the receptacle containing the sample or otherwise. In some embodiments, the pieces of information about the sample may include information about the sample (e.g., sample type, sample age, sample application, radiological characteristics, sample preparation details, and/or samples medium) and/or information collected about the sample based on the imaging data that was collected, or aspects of the image sample that are determined based on one or more features defined herein. In some embodiments, a state-multiplexed Fourier ptychography (FP) recovery routine may be applied, which includes decomposing the incoherent mixture of the FP acquisitions to recover a high-resolution sample image.

In some embodiments, sample illumination and image capture at block S144 in FIG. 1 includes performing Fourier ptychography via spectral multiplexing (SM) to separately produce a two-dimensional image of a polychromatic sample in several bands of the spectrum. For example, the method may include receiving multiplex information and detecting coherent-state decomposition in samples using methods including, but not limited to, SM. In additional or alternative embodiments, color-multiplexed imaging may be performed by simultaneously turning on RGB LEDs for data acquisition. This approach may be configured to provide a solution for handling the partially coherent effect of light sources used in Fourier ptychographic imaging platforms. As different wavelengths pass independently through the optical elements, SM may considerably enlarge the transmission capacity. As opposed to traditional FPM methods, SM may greatly decrease the time-consuming process for data acquisition. As opposed to the method of simply reducing redundant sampling, SM may multiplex information in the Fourier domain.

In some embodiments, the image reconstruction system and/or method that is selected is based on one or more input parameters based on the systems image capture configuration. Exemplary, non-limiting embodiments of input parameters at block S148 may include: illumination configuration, wavelength of illumination(s), and if present, physical specifications of lens or lack thereof, sensors, and diffusers. In instances where an LED array is utilized, further parameters may include array size/dimensions, illumination sequence, and LED step distance. Spatial information, including position and distance of components may also be specified; for example, the distance between, and relative positions of the illumination source and sample. Further instances of parameters that may be system specific are use of optical tables, vibration dampening materials, mechanical filters, software post-processing, and/or active cancellation technology for optical vibration isolation.

In some embodiments, the generation of full field of view images (e.g., whole slide images) may be generated after image capture, before or after FP reconstruction. Each image captured may at least partially overlap with a neighboring or adjacent image. Each image captured may have about 5-25%, 5-50%, 1-50%, overlap with its neighbor and the whole set may be collectively stitched together to make a complete whole slide image. In some embodiments, random sample consensus (RANSAC) stitching, scale-invariant feature transformation, key point matching, Lowe's method for feature generation, or similar algorithms known to one skilled in the art may be used to stitch together the image giving a larger field of view. In some embodiments, deep convolutional neural networks may generate homographic estimates of images.

In some embodiments, as shown in post-processing at block S152 and artificial intelligence, machine learning, or deep learning assessment at block S154 in FIG. 1, analysis of one or more images may include feature identification using one or more post-processing methods, one or more machine learning models, and/or deep learning models. Features that may be identified in one or more images of one or more samples may include, but not be limited to: cell count, nucleus, edges, groupings, clump size, spatial information, or a combination thereof. Additional cytological features that may be identified may include, but are not limited to: atypical mitoses, chromatin granularity, chromatin hyperchromasia, nuclei number, nuclear size, mitoses, nuclear membrane irregularities (e.g., clefting, flat edges, sharp angles, scalloped, etc.), nuclear pleomorphism, nuclear-to-cytoplasmic ratio, nucleoli shape (e.g., angulated, spiked, complex, etc.), nucleoli size, cell division rates, spindle length, cellular membrane density, fat pockets, bacterial count, and/or motility patterns. These cytological features may be key indicators for one or more of: cancer growth, metastatic potential, infertility, bacterial presence, bacterial resistance, validation of sample quality, and/or a combination thereof. Sample assessment may further comprise the use of computer-assisted sample evaluation. In some embodiments, evaluation may occur via classification or regression algorithms (e.g., supervised, unsupervised, or a combination thereof). The algorithms may be trained on characteristics and/or features extracted from quantitative phase images, intensity only images, or may use raw data. In some embodiments, multilayer models may be developed. The models may be trained to determine sample adequacy, sample contents identification, cell type, and/or abnormalities and frequency thereof. The output of the models may be Boolean, on a numerical scale, and/or may use common terminology for label identification purposes. Additional information may be used to educate the model further, including but not limited to, sample source demographics, electronic health records, and relevant sample databases to name a few.

In some embodiments, as shown at block S160 of FIG. 1, the method 100 includes outputting a message. In some embodiments, the message may be a result from sample assessment, for example, indicating adequacy or other classification. In other embodiments, the message may include an image of the sample for user verification of the computer-assisted evaluation. In some embodiments, one or more images of the sample may be digitally stained using pre-trained deep learning models and displayed to the viewer. In some embodiments, outputting may include displaying results in real time on a display with or without touch responsive capabilities (e.g., Thin Film Transistor liquid crystal display (LCD), in-place switching LCD, resistive touchscreen LCD, capacitive touchscreen LCD, organic light emitting diode (LED), Active-Matrix organic LED (AMOLED), Super AMOLED, Retina display, Haptic/Tactile touchscreen, or Gorilla Glass). Alternatively or additionally, outputting may include transmitting a message or image to a computing device (e.g., laptop, desktop, workstation, mobile device, pager, personal digital assistant, smart glasses, smart watches, etc.) communicatively (wirelessly or wired) coupled to the device or system 200.

Figure 12:
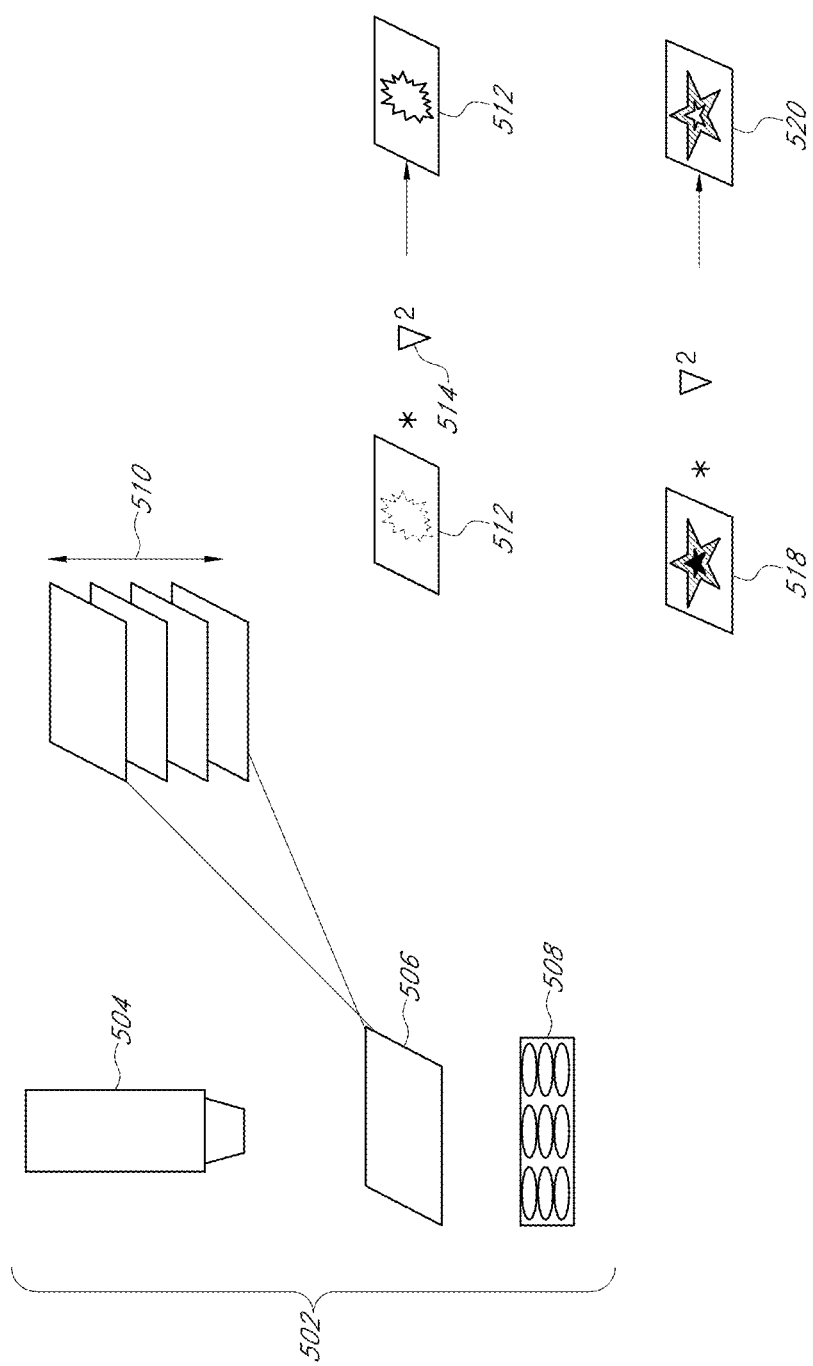
FIG. 12 illustrates a schematic of one embodiment of an autofocusing method using variance of the Laplacian.

Turning now to FIGS. 12-19, which describe autofocusing, sample illumination, and image capture, first introduced in connection with blocks S142 and S144 in FIG. 1. In some embodiments, autofocusing functions may be used to determine correct focus or a correct focal plane for a sample or an area of interest in the sample. In some embodiments, as shown in FIG. 12, variance of the Laplacian method may be used to determine the optimal focal distance in an area of interest of a sample. For example, the imager 502 may consist of an optical component 504 (e.g., one or more sensors with or without one or more lenses), an illumination source 508, and a mechanical stage component 506. One or more of the imagers may remain stationary, such that a mechanical stage positions the sample for imaging relative to the one or more optical components. In some embodiments, one or more image stacks 510 are obtained at various focal distances. This method may comprise applying a Laplacian operator 514 to measure the second derivative of an image (e.g., images 510, 512, 518), wherein the Laplacian highlights regions of an image containing rapid intensity changes. In instances where an image contains very low variance 516, there may be a small spread of responses, indicating that there are very few edges in the image, indicating that the image is blurred or out of focus 512. In instances where an image contains high variance 520, there may be a wide spread of both edge-like and non-edge like responses that are representative of a normal, in-focus image 518. If the variance falls below a predefined threshold, then the image may be classified as blurry; otherwise, the image may be classified as not blurry. In some embodiments, the optimal focal distances for a plurality of areas of interest may be repeated to map the focal plane for the full field of view. In some instances, the systems, devices, and methods may be configured to determine a threshold level of edges based on one or more features of a sample, including, for example, the sample type, and classify the images as blurred or in-focus based on one or more features of the sample. In some embodiments, multiple autofocus maps may be generated while others may not necessitate autofocus mapping and hill climbing, for example.

Figure 13:
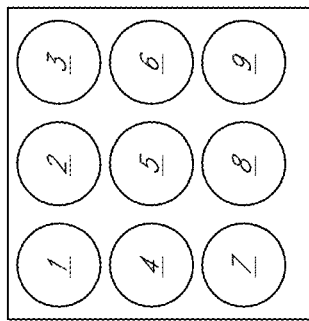
FIGS. 13-16 illustrate various illumination schemes for a sample being analyzed by one or more systems and methods described herein.
Figure 14:
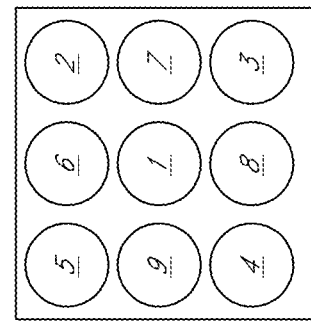
Figure 15:
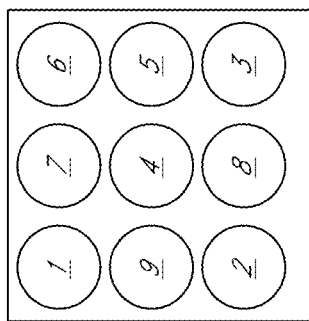
Figure 16:
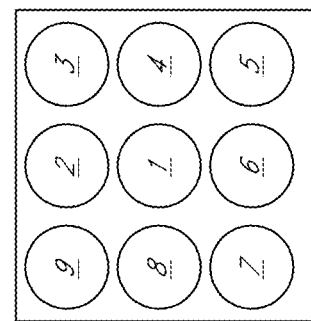

In some instances, the illumination source of the imager in Far-Field Fourier Ptychography may consist of an LED array. Illumination schemes may be modified to optimize image capture, as shown in FIGS. 13-16 and may be extended or modified based on the actual dimensions of the LED panel in use. FIG. 13 shows schematically a random illumination sequence. FIG. 14 shows schematically a raster illumination sequence. FIG. 15 shows schematically a spiral illumination sequence. FIG. 16 shows schematically a numerical aperture of an optical system for illuminating a sample. In some embodiments, when multiple wavelengths of light are employed, more than one LED may be illuminated at a time. In some instances, after autofocusing, a plurality of images of a sample may be obtained under a variety of predetermined lighting conditions for further evaluation/analysis. In some embodiments, images include frames of a video. In some embodiments, the total number (N) of the plurality of different illumination conditions is between 2 to 10, between 5 to 50, between 10 to 100, between 50 to 1000, or more than 1000. In some embodiments, one or more light sources and/or one or more system operations may be controlled using an embedded computer system directly or through a Field Programmable Gate Array (FPGA) or other digital logic device.

In some instances, the plurality of images captured under multiple lighting conditions at block S144 in FIG. 1 may be used to obtain computationally derived super-resolution, quantitative phase images for microscopic evaluation. For example, in some embodiments Near- or Far-Field Fourier ptychographic reconstruction, embodied in blocks S146, S148, and S150 in FIG. 1, may be employed to bypass current limitations in the space-bandwidth product of traditional microscopy and ptychography methods for whole sample imaging. In these embodiments, phase retrieval information is used to characterize biological objects present in a sample based on the principle that phase information characterizes how much light is delayed through propagation, and how much is lost during the imaging process. Phase retrieval techniques may be used to recover phase information by using intensity only measurements. In some embodiments, this may include alternating enforcements of the known information of the object in the spatial and Fourier domains. These methods may further include performing aperture synthesis for bypassing the resolution limit of traditional microscopy techniques. Aperture synthesis may include combining information from a collection of sources to expand the Fourier passband and improve the achievable resolution. Taken together, these methods disclosed herein are able to automate one or more aspects of super-resolution imaging of a sample that is limited only by the wavelength of the radiation used and not by the quality of optical lenses.

In some embodiments, the image data from the image sensor may be read into the embedded computer system for reconstruction of the final image. In some embodiments, the image data from the image sensor is read by an FPGA and reconstructed there before being passed onto the embedded computer system for further analysis. In some embodiments, the image data is passed from the image sensor to a Graphics Processing Unit (GPU) for processing through either the embedded computer system or an FPGA to embedded computer system combination. In some embodiments, the software may accommodate for minute variation in the system by measuring factors including, but not limited to, LED brightness, LED spatial location, glass slide defects, spatial location and angles relative to the CMOS sensor, prism deformities, sample aberrations, and lens defects or obstructions and minimize their overall impact on the final deconvolution process. In some embodiments, iterative reconstruction may be performed by one or more FPGAs, quantum computers, graphics processing units, or logical processors.

Figure 18:
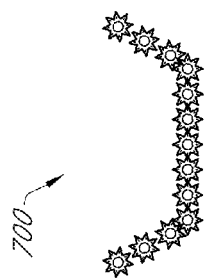
FIGS. 17-19 illustrate one embodiment of a Far-field Fourier ptychography system.
Figure 17:
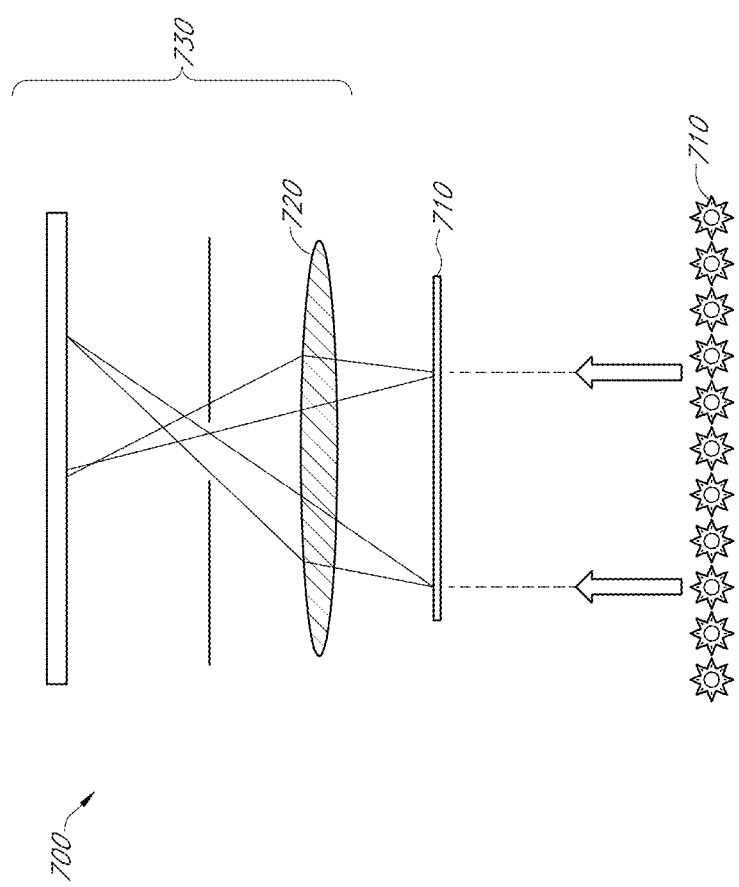
Figure 19:
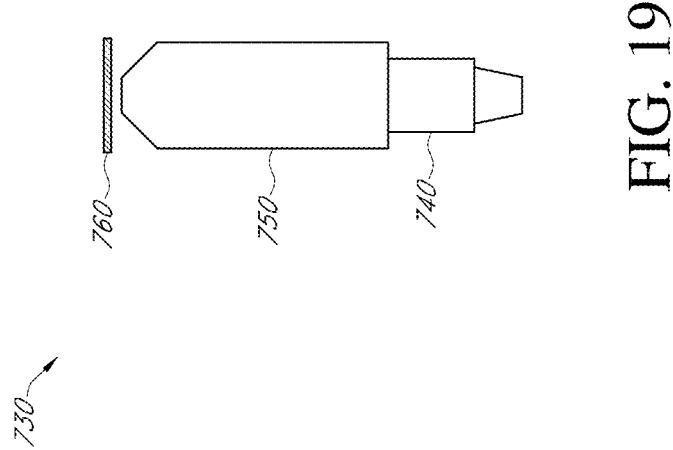

One exemplary embodiment of a Far-field Fourier ptychography system is shown in FIGS. 17-19. The system is designed to capture a plurality of images under a variety of illumination conditions for FP reconstruction. In some embodiments, a Far-field Fourier ptychographic system includes: an illumination source positioned relative to a biological sample such that the biological sample is backlit, such that the illumination source is configured to apply light to the biological sample in rapid succession and to generate incident rays of light when applied to the biological sample; a sensor configured to capture a plurality of images based on one or more diffraction patterns generated from an optical transmission function of the biological sample; a lens configured to project the one or more diffraction patterns onto the sensor; and a processor configured to: reconstruct the original optical transmission function of the biological sample, stitch the plurality of images together, and identify one or more features of the biological sample.

FIG. 17 is a generalized schematic of an exemplary image capture configuration including an illumination source, for example, an LED array 700 using one or more wavelengths of light that pass light through a sample 710 (see block S120 of FIG. 1), and may continue through an optional lens 720 (e.g., infinity correcting lens) before being transmitted to an optical stack 730. In some embodiments, lens 720 may range from a single element to eighteen elements (i.e., pieces of glass), in a single group to eight groups. FIG. 18 demonstrates another embodiment of an illumination source 700 for the system of FIG. 17, where one or more or a plurality of LEDs are positioned in one or more planes. In some embodiments, the illumination source 700 may comprise one or more LED panels comprising at least 5×5 individual diodes in one or more dimensions. In some embodiments, individual LEDs may be spaced regularly in one or more planes (i.e., periodic); in other embodiments, individual diodes may be irregularly spaced (i.e., non-periodic) in one or more planes. In other embodiments, the LED array may comprise a grid of LEDs, for example square or rectangular array shaped with 5-40 along an x-axis and corresponding 5-40 along a y-axis (e.g., 19×19 LEDs), 7-40 LEDs arranged in concentric circles, or illumination by LED or LCD display. In some embodiments, the array comprises one or more or a plurality of point light sources. For example, the one or more point light sources may be configured to emit electromagnetic radiation at wavelengths of 700-635 nm, 560-520 nm, 490-450 nm, and 495-570 nm. The various LED configurations may then be programmed to illuminate in a predetermined or computationally optimized sequence as described in FIGS. 13-16. In some embodiments, the illumination source 700 may comprise OLED displays, LCD displays, MicroLEDs, single-mode-fiber-coupled lasers, laser diodes, or other radiation emitting material such as Perovskite. In some embodiments, systems may include light modulating devices such as wavelength filters and beam splitters.

FIG. 19 shows various components of one embodiment of the optical stack 730 of FIG. 17. The optical stack 730 may include an objective lens 740 with a numerical aperture ranging from 0.04 to 1.45, an infinity-corrected tube/compound lens 750 (e.g., comprising components ranging from a single element to eighteen elements (i.e., pieces of glass), in a single group and up to eight groups. The lens may have a focal length ranging from 35 mm to 200 mm).

FIG. 19 further shows sensor 760 as part of optical stack 730. In some embodiments, the sensor 760 of the optical stack 730 includes a charge coupled device (CCD), a complementary metal-oxide-semiconductor (CMOS), lens, light-emitting diode (LED) board, and/or other image capture sensor or module. The sensor may, in some embodiments, be further configured to capture at least 4 bits, at least 6 bits, at least 8 bits, at least 10 bits, 4-10 bits, 4-8 bits, 4-6 bits, etc. of grayscale intensity. In some embodiments, the one or more diffraction patterns used to capture the plurality of images are multiplexed for the detection of coherent-state decomposition. Further, in some embodiments, frequency mixing between the biological sample and the structured light shifts the high frequency biological sample information to a passband of the sensor.

In some embodiments, a Far-field Fourier ptychography system further includes one or more processors or integrated circuits. For example, at least one of the integrated circuits may be an FPGA configured to perform image reconstruction. In some embodiments, one or more processors or integrated circuits may be configured to select one or more of: a pattern of illumination, a frequency of illumination, a wavelength of illumination, or a combination thereof of the illumination source based on one or more features of the biological sample. The one or more features may include, but are not limited to: a sample type, a sample age, a sample application, or a combination thereof.

Figure 20:
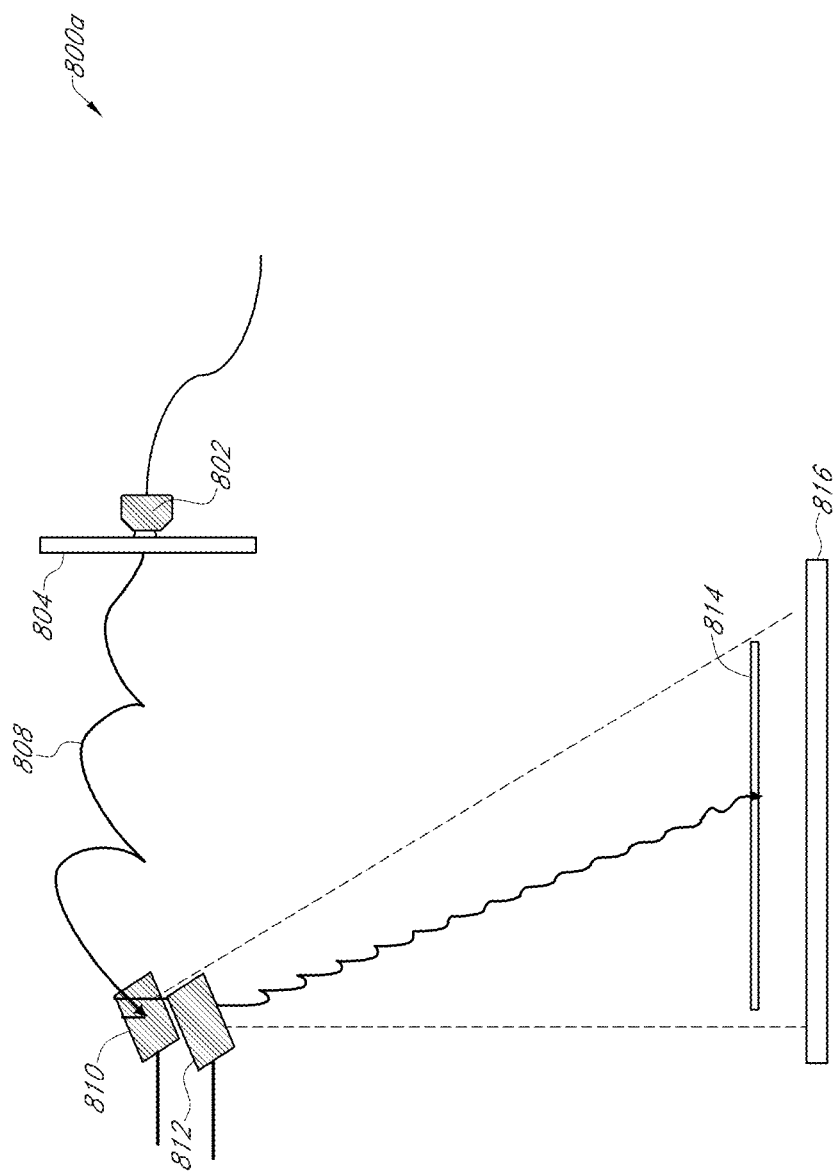
FIGS. 20-22 illustrate various embodiments of a near-field Fourier ptychography system.
Figure 21:
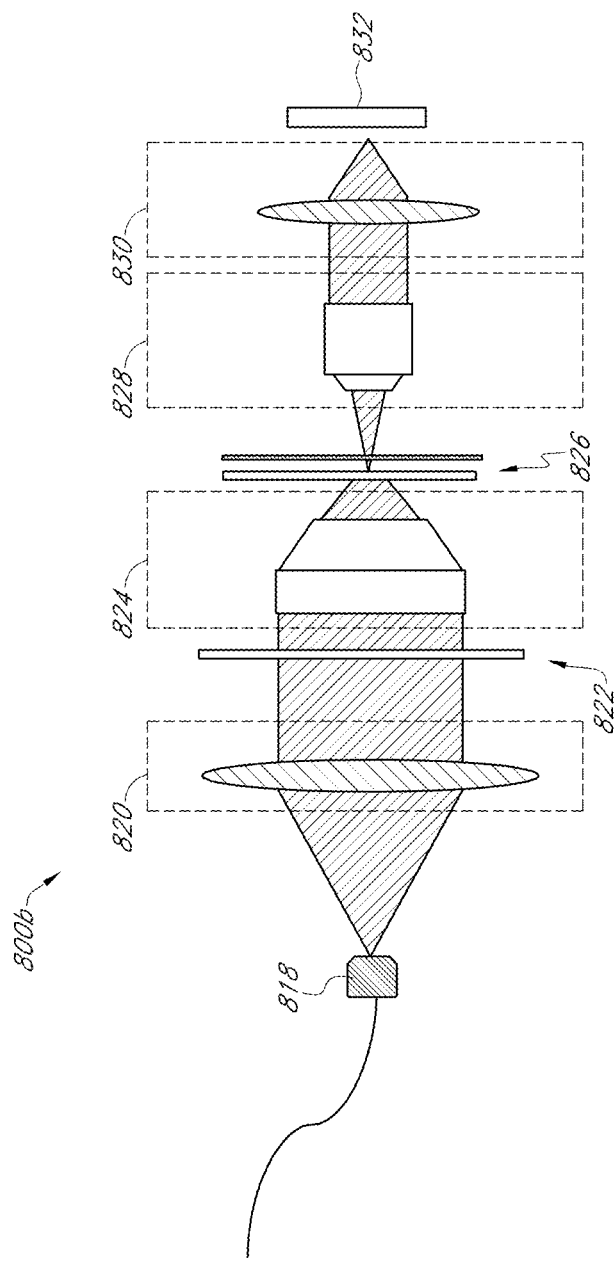
Figure 22:
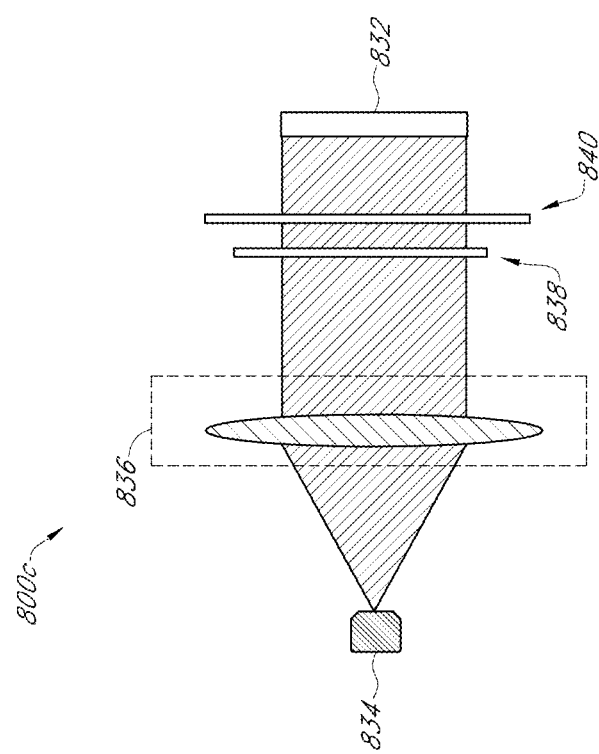

Exemplary embodiments of a near-field Fourier ptychography system is shown in FIGS. 20-22. In some embodiments, the near-field Fourier ptychography may allow a large Fresnel number of the signal to be recovered by the sensor. This high Fresnel number may allow for much more information about the incoming light waves to be recorded and recovered in the Fourier transform. This, in combination with the near-field recovery processes, which are similar to that of far-field, allows for the characterization and recovery of the speckle pattern created by the diffuser, a high-resolution reconstruction of the intensity of the sample, and a high-resolution reconstruction of the phase of the sample. Without wishing to be bound by theory, near-field ptychography differs from far-field ptychography by using a single coherent light source (e.g., laser or laser diode) which is diffused and modulated over the sample rather than using a plurality of light sources with different angles of illumination. Additionally, a defocus distance may be used when capturing images in order to translate phase differences to intensity differences in the captured images. Some implementations of this method use a condensing lens to focus the diffusion pattern over a smaller area. This creates more finely diffused features which increase the factor by which the recovered image can increase its resolution. Some implementations also have used an objective lens and a tube lens to transfer light onto the sensor while still maintaining the defocus distance. Some implementations omit parts of the previously mentioned hardware so that the light source is diffused, transmitted to the sample, and finally the diffused light, which has interacted with the sample (and sample holding apparatus), is transmitted directly to the sensor.

FIGS. 20-22 illustrate various embodiments of a near-field Fourier ptychography system 800a. The systems shown in FIGS. 20-22 do not necessarily require scanning microscopy. In general, a near-field Fourier ptychography system includes: at least one coherent light source configured to illuminate a biological sample positioned relative to the at least one coherent light source; a diffuser configured to diffuse light produced by the at least one coherent light source, such that the light is diffused in a speckled pattern either before the light interacts with the biological sample or after the light has interacted with the biological sample; a sensor configured to capture a plurality of illuminated images with an embedded speckle pattern of the biological sample based on the diffused light; and a processor or integrated circuit and a non-transitory computer-readable medium. The processor may be configured to perform a method including: iteratively reconstructing the plurality of speckled illuminated images of the biological sample to recover an image stack of reconstructed images; stitching together each image in the image stack to create a whole slide image, such that therein each image of the image stack at least partially overlaps with a neighboring image; and identifying one or more features of the biological sample.

Optionally, the processor may be further configured to characterize a speckled pattern to be applied by the diffuser.

As shown in system 800a in FIG. 20, a single beam of coherent light produced by a fiber-coupled laser, laser-diode, or similar device 802 is passed through a diffuser or diffusing medium 804 to produce an embedded speckle pattern. In some embodiments, the diffuser 804 may be scotch tape, a random phase plate, styrene coated coverslip, or any other diffuser or diffusing medium known to one skilled in the art. The angle of the diffused coherent light 808 may be directed towards the sample 814 using one or more reflective surfaces 810, such as mirrors, metals or highly polished silica, that are modulated using one or more galvanometers or other motion control device 812. After passing through the sample 814, the data may be captured by one or more sensors 816, including but not limited to, CCD, CMOS, negative channel metal oxide semiconductor NMOS, etc. The sensor may, in some embodiments, be further configured to capture at least 4 bits, at least 6 bits, at least 8 bits, at least 10 bits, 4-10 bits, 4-8 bits, 4-6 bits of grayscale intensity.

In some embodiments, a processor is configured to select one or more of: a pattern of illumination, a frequency of illumination, a wavelength of illumination, or a combination thereof of the at least one coherent light source based on one or more features of the biological sample. Exemplary, non-limiting features include: a sample type, a sample age, a sample application, or a combination thereof.

Another embodiment of a near-field Ptychography system 800b is shown in FIG. 21. As shown in this view, a single beam of coherent light produced by fiber-coupled laser, laser-diode, or similar device 818 may optionally pass through a low numerical aperture lens 820, followed by a diffuser or diffusing medium 822 (as defined above), to produce a translated speckle pattern. An optional condenser 824 may focus the illumination which then passes through a sample 826 that is placed at an offset/defocus position, for example 20 to 100 µm, relative to the focal plane perpendicular to the illumination source. Motorized stages may move the sample 826 in this plane in one or more or a plurality of predetermined step sizes, each of which is different from another. In some exemplary, non-limiting embodiments, the step size may be 0 to 2 µm, less than 1 µm, 0.5 to 1 µm, or 0.5 to 0.75 µm. Prior to transmission to the sensor 832, in some embodiments, the illumination may or may not pass through an objective lens 828 and/or a tube lens 830.

FIG. 22 shows another embodiment of a near-field Fourier Ptychography system 800c. In some embodiments, an advantage to this approach over illumination-based microscopy (e.g., confocal, phase contrast microscopy, differential interference phase contrast, dark-field microscopy, UV and fluorescence microscopy, and other FPM techniques) may be that thicker samples can be imaged because the recovered image only depends upon how the complex wavefront exits the sample. A single beam of coherent light produced by a fiber-coupled laser, laser-diode, or similar device 834 may optionally pass through an infinity corrected objective lens 836, followed by a motor controlled diffuser or diffusing medium 840 that is translationally shifted in step sizes (around 1 mm) in the X-Y dimension relative to the illumination source 834, and a monochromatic sensor 842 for analyzing sample 842. The total distance between the sample and the sensor 842 may be less than 1 millimeter to give an ultra-high Fresnel number reducing the need for positioning accuracy and allows the field of view to span the entire sensor area.

Figure 23:
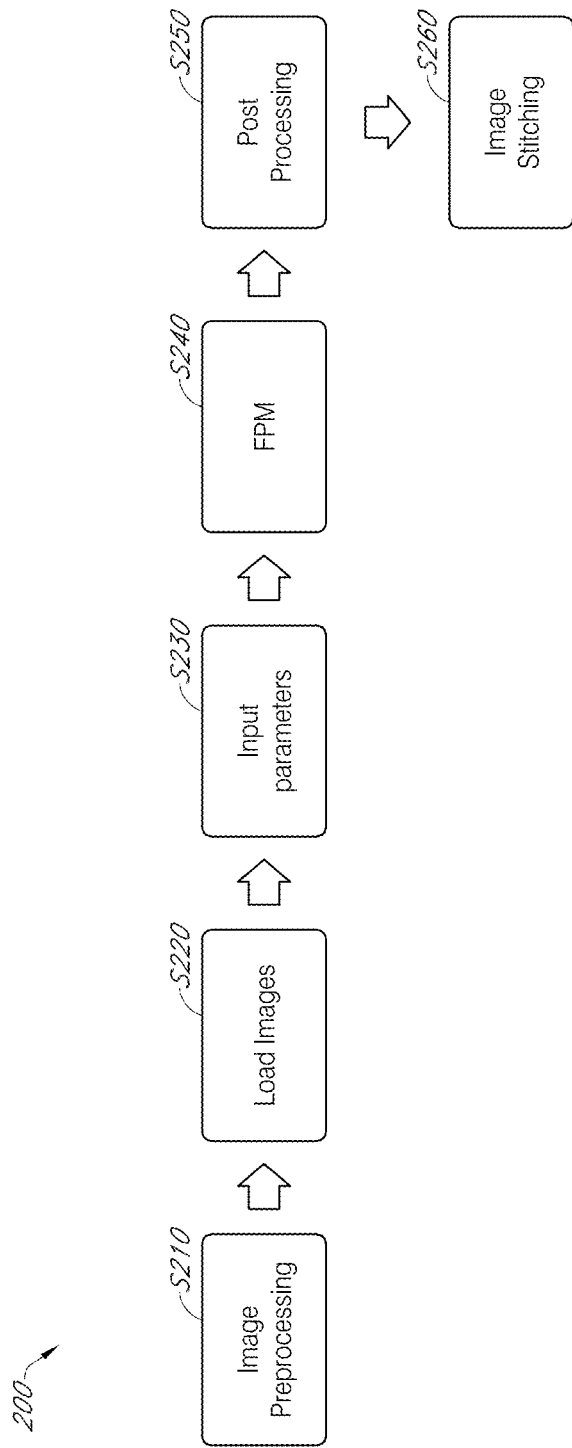
FIG. 23 is a flow diagram of a general method of generating a large field of view high-resolution image.

FIG. 23 shows a method 200 that may be embodied to prepare one or more high-resolution images from a plurality of low-resolution images obtained under one or more illumination conditions (referred to hereafter as an image stack) for Fourier ptychography microscopy (FPM) reconstruction S240. Further, the image stack may include tiles or subsets of the full field of view that may be combined to generate a full slide image based on position and/or image stitching processes, described elsewhere herein. The method 200 may include one or more preprocessing methods S210, followed by image loading S220, and receiving as an input one or more system parameters S230. In some embodiments, post processing at block S250 may occur followed by image stitching at block S260 to produce a larger field of view. This process may occur internally using an integrated circuit, for example an FPGA, or externally using one or more external processors.

In some cases, image pre-processing (e.g., image optimization/enhancement on low-resolution image stacks) at block S210 may include one or more transformations including AI/non AI image sharpening, intensity bounding, LED normalization, filtering (e.g., linear or bilateral), cropping, geometric transformation correction, duplicate identification, ray tracing, and/or other methods known to one skilled in the art. In some embodiments, block S210 may include applying a defocus mask to one or more images. A resolution of one or more images acquired may be increased using a defocus mask, for example. A defocus mask may reduce the aliasing and/or blur of the one or more images present. The defocus mask may be the product of machine learning or a deep learning algorithm which takes one or more images as inputs and which produces a second image, or a defocus mask which may be applied additively or multiplicatively. The inputs for such an algorithm may be one or more images and the output may be a second image which is more sharp or clear (e.g., has increased acutance), or a defocus mask which when applied additively or multiplicatively increases the sharpness or clarity of an image. In some embodiments, the machine learning algorithm is a neural network, deep neural network, or another algorithm known to one of skill in the art, which would learn what sharp images and clear images look like from a low resolution, unsharp, unfocused, or highly aliased image, or some combination thereof. Such a method may also be accomplished by creating an algorithm to teach a machine learning or deep learning algorithm, or by a manual rule set passed to a machine learning algorithm with one or more analog, digital, or quantum processors which can execute code, which would create a model which could be executed on one or more processors. Rules may dictate which one or more features in an image are curved and to what degree and, conversely, which of the one or more features are straight. Such an algorithm further functions to determine a density of a feature in an image and a minimum and/or maximum thickness in order to reduce aliasing, increases sharpness, and/or increase clarity to the maximum amount.

In some embodiments, image pre-processing also may include normalization, a process that changes the range of pixel intensity values. Without wishing to be bound by theory, the purpose of dynamic range expansion in the various applications is usually to bring the image, or other type of signal, into a range that is more familiar or normal to the senses, hence the term normalization. One embodiment of linear intensity normalization involves transforming an n-dimensional grayscale image (I) with intensity values in the range (min, max), into a new image ($I_N$) with intensity values in the range ($min_{new}$, $max_{new}$). Normalization might also be non-linear, which may happen when there is not a linear relationship between I and $I_N$. An example of non-linear normalization is when the normalization follows a sigmoid function; in that case, the normalized image is computed.

In some embodiments, pre-processing may also include filtering. In some embodiments of signal processing, a filter is a device or process that removes some unwanted components or features from a signal. Without wishing to be bound by theory, filtering is a class of signal processing, the defining feature of filters being the complete or partial suppression of some aspect of the signal. In one embodiment, this means removing some frequencies or frequency bands. However, filters do not exclusively act in the frequency domain; especially in the field of image processing, many other targets for filtering exist. Correlations may be removed for certain frequency components and not for others without having to act in the frequency domain. There are many different bases of classifying filters and these overlap in many different ways; there is no simple hierarchical classification. Filters may be non-linear or linear, time-variant or time-invariant (i.e., shift invariance), causal or not-causal, analog or digital, discrete-time (e.g., sampled) or continuous-time, passive or active type of continuous-time filter, infinite impulse response (IIR) or finite impulse response (FIR) type of discrete-time or digital filter.

In some embodiments, pre-processing also may include sharpening the image. Image sharpening techniques can be used to both sharpen and blur images in a number of ways, such as unsharp masking or deconvolution. One embodiment of image sharpening techniques may involve a form of contrast. This may be done by finding the average color of the pixels around each pixel in a specified radius, and then contrasting that pixel from that average color. This effect makes the image seem clearer, seemingly adding details.

In some embodiments, image preprocessing may also include geometric transformations for image registration and the removal of geometric distortion. A spatial transformation of an image may include a geometric transformation of the image coordinate system for the purpose(s) of aligning images that were taken under different conditions, correcting images for lens distortion, correcting effects of camera orientation, and/or image morphing or other special effects. In one embodiment, in a spatial transformation, each point (x,y) of image A is mapped to a point (u,v) in a new coordinate system. A digital image array has an implicit grid that is mapped to discrete points in the new domain. Interpolation may be needed to find the value of the image at the grid points in the target coordinate system. These points may not fall on grid points in the new domain Some embodiments may include affine transformations (any transformation that preserves collinearity and ratios of distances), a composition of rotations, translations, magnifications, and/or shears.

Further, in some embodiments, image pre-processing includes ray tracing. In computer graphics, ray tracing may include a rendering technique for generating an image by tracing the path of light as pixels in an image plane and simulating the effects of its encounters with virtual objects. The technique is capable of producing a very high degree of visual realism, in some embodiments, quite higher than that of typical scanline rendering methods, but at a greater computational cost. Ray tracing may be capable of simulating a wide variety of optical effects, such as reflection and refraction, scattering, and dispersion phenomena (such as chromatic aberration). In one embodiment, ray tracing may involve creating a path from an imaginary eye through each pixel in a virtual screen and calculating the color of the object visible through it. Each ray must then be tested for intersection with some subset of all the objects in the scene. Once the nearest object has been identified, the algorithm may estimate the incoming light at the point of intersection, examine the material properties of the object, and combine this information to calculate the final color of the pixel. Certain illumination algorithms and reflective or translucent materials may require more rays to be re-cast into the scene.

In some embodiments, the preprocessed low-resolution images from S210 are loaded S220 for FPM super-resolution image reconstruction. The system parameters used to collect the plurality of low-resolution images are defined at block S230 (also defined in block S148 of FIG. 1) to inform the iterative reconstruction algorithm. Non-limiting examples of the system parameters include: illumination configuration, wavelength of illumination(s), and if present, physical specifications of lens (numerical aperture), sensors (bit depth), and diffusers. In instances where an LED array is utilized, further parameters may include array size, array dimensions, illumination sequence, LED step distance, etc.

Figure 24:
FIG. 24 is a flow diagram of one embodiment of a method of Fourier Ptychography iterative image reconstruction.

Upon completion of S210-S230, Fourier ptychographic image reconstruction S240 can be carried out. Without wishing to be bound by theory, Fourier ptychography functions to increase a sampling resolution of an image by bypassing the Nyquist sampling limit of both the sensor and the objective lens used in the system. A flow diagram illustrating a general process for an iterative Fourier ptychographic (near-field or far-Field) image reconstruction method 1000 is shown in FIG. 24. In some embodiments, the method 1000 uses a transfer function to filter out low frequencies of light intensity and/or to correct for a curvature of light in one or more images captured with varying angles of illumination at block S1010. In some embodiments, the transfer function is based on position in the field of view, such the transfer function is adapted to be applied to an entire or full field of view. The filtered information is used to add additional signal information in the Fourier domain which serves to increase the amount of information present in the reconstructed image.

The method 1000 for FPM iterative reconstruction begins with capturing images under multiple illumination conditions resulting in an image stack S1010. Next, method 1000 may include initializing an estimation of a resolution of a final high-resolution reconstructed image S1020. The resulting high resolution image may be cropped in correspondence with the illumination condition. The initial estimation may then be transformed to the Fourier domain and optionally shifted so that the low frequencies obtained through the low-pass filter (LPF) are placed in the center of the transform function (CTF) S1030. The method 1000 may optionally include selecting a region using the result of the Fourier transform to be updated. The region selected may be dependent upon the illumination condition of the current image and may be cropped. In some embodiments, a size of an image may range from a single pixel to an entirety of the pixels spanning the dimensions of the one or more captured images. The selected region may then be multiplied by the transfer function element-wise, optionally inverse shifted, then inverse Fourier transformed to real space S1040. The method 1000 then further includes identifying a complex angle, or phase, for the real space product for each pixel in the selected region S1050. The angles obtained may then be multiplied by the current image element-wise iteratively S1060. The current image product is multiplied by the transfer function, and subsequently Fourier transformed S1070 and shifted using the transfer function S1080. The updated filtered product replaces the selected cropped region at block S1084, and blocks S1030-S1084 are repeated for an entirety of an image stack S1086. Block S1086 is repeated until convergence at block S1088, a local low energy solution is obtained, or a predetermined number of iterations are completed. As shown at block S1090, some or all the blocks identified above may be repeated for all regions of interest (RIOs).

The transfer function at block S1080 may or may not have non integer terms meant to correct for optical aberrations (e.g., Zernike aberrations, difference in LED intensity, location in field of view) due to the optical stack. In some embodiments, the transfer function is meant to filter out high frequency information from the image stack for one or more images that are being updated in the reconstruction. This allows for the removal of noise so that images in ptychography increase both clarity and spatial resolution.

Different embodiments for Fourier ptychography add the information gathered from the various angles of illumination via different methods, as shown at block S1010 of FIG. 24. A fast converging solution may be achieved when images with the lowest numerical aperture are prioritized in the iterative algorithms Similar results are obtained when the order of the images selected for input uses a spiral pattern, however the solution does not converge as quickly. There are also some early embodiments which select images in a raster or random pattern, which converge significantly slower, and the final solution is not to the same quality as spiral or numerical aperture order.

Traditional, far-field Fourier ptychography is able to calculate wave-vectors using known LED positions along with the coordinates of the center of a region of interest within a field of view. In previous embodiments of this system, the region of interest has been centered under the objective lens to simplify these calculations and reduce Zernike aberrations or other aberrations. Other regions within a field of view can be recovered with some corrections to the wave-vector calculations and the transfer function. These wave-vectors may be used to determine the location of where the information from the low-resolution images is placed in the high-resolution reconstruction.

Figure 25:
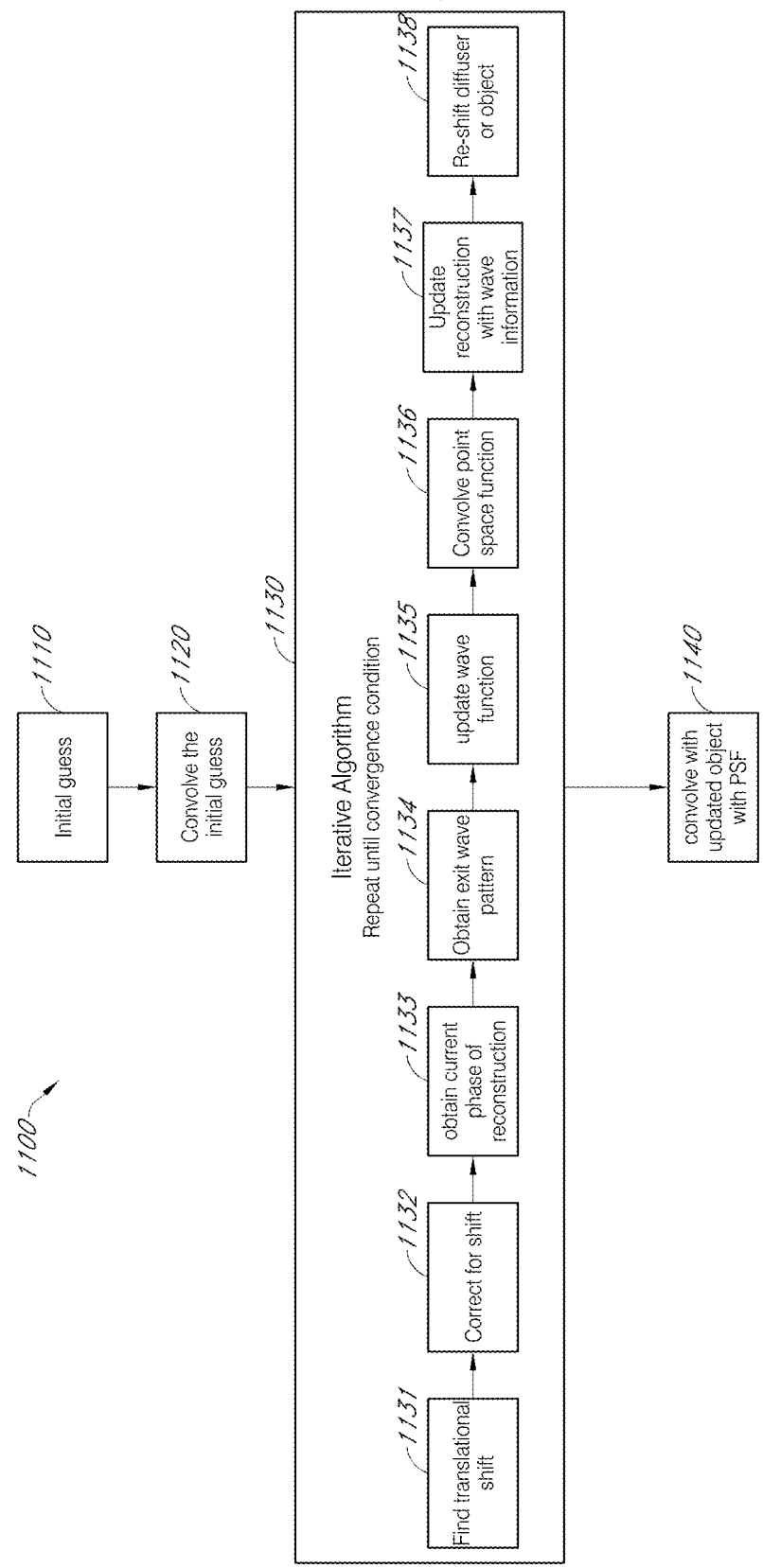
FIG. 25 is a flow diagram of one embodiment of a method of iteratively reconstructing a Fourier Ptychography image for Near-field systems.
Figure 30:
FIG. 30 shows a stitched image, using key point matching, comprising the images of FIGS. 26-29, resulting in a large field of view.
Figure 26:
FIGS. 26-29 show separate high-resolution images of regions of interest reconstructed using Fourier Ptychography reconstruction.
Figure 27:
Figure 28:
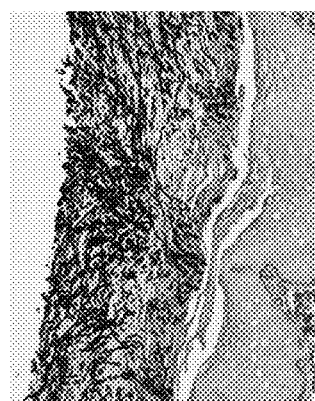
Figure 29:
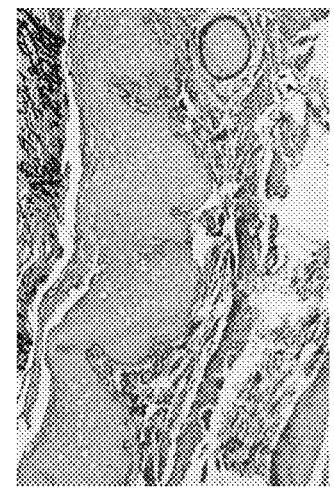

In some embodiments, the iterative reconstruction of far-field uses a calculated or predetermined wave vector, based upon varying angle of illumination, for the placement of specific regions within the higher resolution image. An exemplary near-field iterative reconstruction process, shown in FIG. 25, may use translational shifts based upon the x-y shift of the sensor, sample, or diffuser to predetermine or calculate wave vectors as different regions are lit in this method rather than different angles of illumination. In some embodiments, at least one benefit of near-field ptychography is its extremely high Fresnel number which yields much more information in the frequency domain. This information can be used to get more distinct features as well as mediate illuminating difficulties associated with vibrations and sample thickness as movement increases as the intensity of the laser can be tuned for thicker samples. In some embodiments, a method 1100 for successfully reconstructing a near-field ptychographic image includes initializing an initial guess or estimate of the object and diffraction speckled pattern S1110 followed by convolving the initial guess or estimate with a point spread function S1120. This initial guess or estimate may serve as the foundation for the iterative function that will repeat until a specified convergence criterion is met S1130. These criteria could include a number of iterations, a final image characteristic (e.g., sharpness, contrast, intensity, etc.), or a time-based restriction. The iterative algorithm first finds a translational shift S1131 and corrects the translational shift of the object or speckled pattern that was projected onto the sensor S1132. The system then may obtain the current phase of the reconstruction by multiplying elementwise the object by the speckled pattern S1133. The system then may obtain the exit wave pattern by convolving the phase with the point spread function S1134. This may then be used to update the wavefunction for a high-resolution magnitude projection S1135. The system may then convolve the point space function by the updated wave function S1136. All of this allows the system to update the reconstruction and diffuser profile with the updated wave information in an iterative manner S1137. The system may continue to shift the diffuser or object until the defined convergence criteria is met at block S1138. Once the convergence is successful, the system may convolve the inverse point spread function with the finally updated object as an output at block S1140.

In some embodiments, three-dimensional structure, in real space, of a sample may be determined using ray tracing, path tracing, ray marching, or some combination or derivative thereof after or during ptychography image reconstruction. A method of ray tracing may include tracing a path of one or more rays of light from one or more illumination sources. For example, the path may be between a sensor and one or more illumination sources. In some embodiments, this method reveals which structures light has interacted with in its path from the illumination source to the sensor. In path tracing, a ray of light may be traced from the illumination source through the sample to the sensor, in a similar way to ray tracing, to detail the structure(s) which one or more ray(s) of light have interacted with. Additionally, in path tracing, all objects must be considered as potential light sources which are considered to be the same as known illumination sources. Ray matching is similar to ray tracing where the path of one or more rays of light are traced from the sensor to an illumination source. Ray matching differs from ray tracing in that instead of stopping when the ray is reflected, some or all of the light can be pushed through a sample and can be continued to be traced thereafter. This may be accomplished using one or more digital, analog, or quantum processors which can execute a method based in code. This may also be accomplished via a machine learning or deep learning algorithm where the inputs would be one or more images and a list of the locations or angles of incidence in three-dimensional space of one or more illumination sources. The inputs may also include ray tracing, path tracing, or tensor cores, etc.

Returning to FIG. 1, in some embodiments, one or more high resolution images generated via near-field or far-Field Fourier ptychographic iterative reconstruction at block S150 may optionally undergo further analysis including post processing S152 and optionally computer-assisted (e.g., machine learning, deep learning, artificial intelligence, computer vision, etc.) assessment S154. For example, post processing may include image stitching to generate a larger field of view as shown in FIGS. 26-30. In some embodiments, before image stitching occurs, the high-resolution image stack may undergo one or more image optimization/processing techniques as described at block S210 in FIG. 23.

Other systems based on confocal scanning only use one bright field image with a fixed depth of field, produced by the scanning process, for image stitching. In contrast, ptychography produces darkfield images with brightfield images which are used in the reconstruction process. As such, in the currently described systems and methods, scanned images are not stitched together, rather a plurality of reconstructed images or the image stack is stitched together. Further, ptychography enables an extended depth of field and field of view.

Without wishing to be bound by theory, image stitching is the processes by which a mosaic of images, for example, captured by the sensor and lens sub-system, are converted into line-scans and then a whole slide image. In some embodiments, the system may take a single channel of an image in grayscale and convolve it with the first matrix, prior to stitching, and then derive the variance (i.e., standard deviation squared) of the response. In some embodiments, random sample consensus (RANSAC) stitching or similar algorithms may be used to stitch together one or more images.

In one example, image stitching includes acquiring one or more images of a sample, and stitching the one or more images together to form a comprehensive whole slide image (e.g., at a particular magnification, for example 10× magnification) via a scale-invariant feature transform (SIFT). SIFT may comprise one or more of: scale-space extrema detection, key point localization, orientation assignment, and key point detection. Scale-space extrema detection may comprise one or more searches, overall scales, and image locations. Scale-space extrema detection may be implemented using a variety of methods including the application of a difference-of-Gaussian function to identify potential interest points that are invariant to scale and orientation. Orientation assignment may comprise the assignment of one or more orientations to each key point location based on local image gradient directions. To provide invariance to transformations, future operations may be performed on transformed image data relative to the assigned orientation, scale, and location for each feature. Key point descriptors during key point matching may include local image gradients measured at a selected scale around a key point. These descriptors may be transformed into a representation that allows for significant levels of local shape distortion and change in illumination.

For example, SIFT may be used to detect and describe local features in images. SIFT may be performed to transform image data into scale-invariant coordinates relative to the detected local features while generating large numbers of features densely covering the image over a broad range of scales and locations. For methods involving image matching, SIFT features may be first extracted from a set of reference images and stored in a database. In some embodiments for performing an analysis on biological samples, multiple reference image databases may be used. In methods for performing an analysis on a biological sample, the user may select the reference image database to be used (e.g., based on characteristics of the biological sample, characteristics of the user from which the acquired non-reference sample was derived, as well as other factors). Acquired samples (e.g., new sample, non-reference sample, etc.) may be matched by individually comparing each feature from the new image to the reference samples (e.g., database of previous samples or images) and identifying candidate matching features. Candidate matching features may be identified based on the Euclidean distance of the feature vectors between the acquired sample images and reference images (e.g., images of reference samples and/or previous samples). In some embodiments, fast nearest-neighbor algorithms may be used to identify candidate matching features and compute.

The images shown in FIGS. 26-30 were stitched together and assessed using SIFT. FIGS. 26-29 were stitched together and assessed using SIFT to identify a set of scale-invariant image features (e.g., key points) to form the resulting image shown in FIG. 30. A panorama stitching algorithm may be applied, wherein the algorithm is configured to detect key points (e.g., via DoG, Harris, etc.) and extract local invariant descriptors (e.g., via SIFT, SURF, etc.) from the two or more input images. The stitching method is configured to match descriptors between the two images using one or more of: key point detection and local invariant descriptors, key point matching, RANSAC, perspective warping, and/or a combination thereof. As used in FIGS. 26-29, the RANSAC method is an iterative method to estimate parameters of a mathematical model from a set of observed data that contains outliers, when outliers are to be accorded no influence on the values of the estimates. The RANSAC method may estimate a homography matrix using a set of matched feature vectors. The matched feature vectors may be specific for a type of sample being analyzed (e.g., Bacteria, touch preparation, pap smear, fine needle aspiration, frozen section, histology section, cytology smear, urine, blood, saliva, etc.). After the transformation process, the method may optionally include trimming any unused pixels from the newly stitched image. All of this takes place in an iterative process across the sample image.

In some embodiments, a method for stitching together acquired images may comprise one or more steps related to performing Lowe's method for image feature generation. Without wishing to be bound by theory, Lowe's method is a ratio used for initial segmentation of good key point matches from poor key point matches. In some embodiments, the ratio enables estimation of the best key point for matching. Lowe's method for image feature generation transforms an image into a large collection of feature vectors, each of which is invariant to image translation, scaling, and rotation, partially invariant to illumination changes, and robust to local geometric distortion. Lowe's method may include performing a modification of the K-Dimensional Tree algorithm called the best-bin-first search method wherein one or more of the steps may comprise identifying the nearest neighbors with high probability using only a limited amount of computation. In some embodiments, methods may comprise application of thresholds, for example in instances where the distance ratio is greater than 0.8, Lowe may reject the matches. Such thresholds may eliminate 90% of the false matches while discarding less than 5% of the correct matches. Steps for improving the efficiency of a method of imaging may further comprise a best-bin-first algorithm search that is cut off after a specific threshold, for example after checking the first 200 nearest neighbor candidates. In some embodiments, methods comprising one or more of the thresholding steps described above may outperform an exact nearest neighbor search by about two orders of magnitude. However, it yields results in less than a 5% loss in the number of correct matches, for example when applied to a database of 100,000 key points.

In one embodiment of image stitching, a deep convolutional neural network (CNN) may be used to generate homographic estimates of images. The deep-CNN may be trained by randomly cropping an image at a position P, corresponding to a patch A. Patch A may then be randomly perturbed at the four corners. The homographic estimate ($H^{AB}$) of the image may be computed based on these perturbations. The $(H^{AB})^{-1}=H^{BA}$ may be applied to the image and then may be cropped again at the position P, corresponding to a patch B. Patch A and patch B may be stacked channel-wise and fed into the deep-CNN with $H^{AB}$ set as the target vector. Using this model, the super resolution reconstructions may be stitched to form a larger image. In this example, letters P, A, and B are used for illustrative purposes only.

Various sample analysis methods and parameters will now be described in detail. The systems, devices, and methods described elsewhere herein for performing an assessment on a sample may be configured and/or adapted to function for any suitable sample processing and/or preparation of the sample. Any of the parameters of the system, including frequency, intensity, distance, incidence, wavelength, pattern, LED array shape, sample treatment steps, sample analysis steps, sample form (e.g., vial or slide), etc. may be configured for the specific type of sample being assessed. Examples of sample types and corresponding exemplary embodiments of the systems, devices or methods for the corresponding biological sample assessment are provided herein.

Far- or near-field Fourier ptychographic microscopy addresses many of the limitations that are observed in microscopy applications in pathology. Due to the iterative reconstruction algorithm, super-resolution images may be obtained without the use of high numerical lenses, meaning one can maintain a full field of view. Additionally, samples may not need to undergo specialized preparation and/or staining protocols because both phase and intensity of the sample image is obtained. Further, uneven or irregular samples (e.g., cytological specimens) may be imaged because variance in the Z-axis/focusing is no longer an issue.

Assessment of biological samples is an ideal implementation of far- or near-field Fourier ptychographic microscopy because QPI data, along with intensity of images are obtained. QPI information includes optical phase delay information that can be related to the physical and chemical properties of the sample. In some cases, the optical delay may serve as a signature to identify sample contents (e.g., red blood cells, sub-cellular organelles, nucleated cells, etc.). Consequently, more data is available for detection and analysis via computer vision, machine learning, and deep learning resulting in more accurate computer-assisted analyses relative to analyses performed on intensity only images.

One exemplary application of this novel methodology of biological sample imaging is Quality Assessment of Fine Needle Aspirations. Cells illuminated in the final resolution image of stained or unstained cytological samples can be identified and categorized based on nuclear composition and spatial relationship. For example, a method for performing an assessment on a biological sample may include identifying one or more clumping patterns of a plurality of nucleated cells and outputting an indication of adequacy. Once a predefined threshold, for example 6 contiguous clusters of 10 nucleated cells, are identified, a quality sample has been reached. In other embodiments, algorithms may determine thresholds for adequacy.

In any of the preceding embodiments, a machine learning or deep learning model (e.g., trained to detect adequacy based on a predetermined threshold) may be used to select one or more regions of interest based on a presence of one or more clusters and assess the adequacy of the biological sample. In other embodiments, a machine learning or deep learning model may be used to select one or more regions of interest based on a presence of one or more clusters, and computer vision may be used to classify the one or more regions of interest based on the adequacy in each region of interest.

As another example, a method for performing an assessment on a biological sample may include identifying (e.g., in real time) tumor margins in core or excisional biopsy samples prepared via touch preparation or frozen section techniques. Based on cellular characteristics such as atypical mitoses, chromatin granularity, chromatin hyperchromasia, nuclei number, nuclear size, mitoses, nuclear membrane irregularities (e.g., clefting, flat edges, sharp angles, scalloped), nuclear pleomorphism, nuclear-to-cytoplasmic ratio, nucleoli shape (angulated/spiked/complex), nucleoli size, cell division rates, spindle length, and/or cellular membrane density, etc., margins of cancerous and non-cancerous samples can be identified guiding the surgical procedure of tumor removal.

In still other examples, a method for performing an assessment on a biological sample may include identifying one or more renal tubules in a kidney biopsy sample and verifying that the needle was positively passed through the kidney during the tissue extraction procedure.

In yet another example, a method for performing an assessment on a biological sample may include determining a quantity and/or quality of bacteria present in a given sample. With or without sample stain preparation techniques that can include, but are not limited to, gram staining, acid fast staining, capsule staining, endospore staining, and/or flagella staining, bacterial load and resistance, one or more characteristics can be identified allowing for more targeted antibacterial treatments across multiple species. In some embodiments, a bacterial sample may be stained using a digital stain described elsewhere herein. Beyond medical applications, these bacterial identification techniques also may improve food and water contamination assessments.

Further for example, a method for performing an assessment on a biological sample may include identifying one or more morphological and/or behavioral traits of a sperm cell in solution. Based on the presence or absence of physical characteristics (e.g., multiple flagella, multiple or abnormal head, abnormal N:C ratios, chromatin granularity, nuclear folds, multiple nuclei, etc.), this method may enable a clinician to determine implications for infertility in multiple species (e.g., humans, horses, dogs, cats, etc.). Based on a regular frame rate (e.g., 0.25, 0.5, 1, 2, 4, 8, 16, 32 frames per second), behavioral features of individual sperm swimming patterns and flagella motility may be visible to determine secondary defects that could lead to infertility.

As another example, a method for performing an assessment on a biological sample may include determining a metastatic potential, a grading, and/or an identity of a given cancer biopsy sample based on one or more features that may include, but are not limited to, atypical mitoses, chromatin granularity, chromatin hyperchromasia, nuclei number, nuclear size, mitoses, nuclear membrane irregularities (e.g., clefting, flat edges, sharp angles, scalloped) nuclear pleomorphism, nuclear-to-cytoplasmic ratio, nucleoli shape (e.g., angulated, spiked, complex), nucleoli size, cell division rates, spindle length, cellular membrane density, and/or movement patterns. Identification of these indicators may help guide clinicians in their decision on how aggressively they should move into treatment for a given patient across multiple species.

Further for example, a method for performing an assessment on a biological sample may include identifying one or more cellular and/or bacterial architecture features (e.g., atypical mitoses, chromatin granularity, chromatin hyperchromasia, nuclei number, nuclear size, mitoses, nuclear membrane irregularities (e.g., clefting, flat edges, sharp angles, scalloped) nuclear pleomorphism, nuclear-to-cytoplasmic ratio, nucleoli shape (e.g., angulated, spiked, complex), nucleoli size, cell division rates, spindle length, count, spatial relationship and/or cellular membrane density in cervical tissue biopsies, scrapings, or swabs to identify the presence or absence of cancerous cells or infections.

Further for example, a method for performing an assessment on a biological sample may include identifying, quantifying, and/or characterizing one or more fungal cells, spores, and/or hyphae in a sample of blood, urine, stool, saliva, skin scrapings, and/or discharge to determine a presence or absence of normal microbial flora and/or infectious agents across multiple species. Beyond medical applications, these bacterial identification techniques also may improve food and water contamination assessments.

Sample assessment (e.g., assessment of a biological sample) may comprise any assessment for quality of the sample, diagnosis, or other determination of the failing or meeting of one or more features, qualities, or criteria. In some embodiments, methods comprise use of an automated platform for the microscopic examination of adequacy.

In some embodiments, a method for performing an assessment on a sample (e.g., on-site assessment of cytology smears) may include verifying sample quality by analyzing and/or using a cell count, nuclear to cytoplasmic area ratio, and/or cluster identification process to assess cytology smear adequacy, a Boolean result.

Further for example, a method for performing an assessment on a biological sample may include recording one or more images into a standardized format (e.g., DICOM) into a versatile repository (e.g., Vendor Neutral Archive) to enable rapid transmission of information between facilities for remote assessment and telepathology.

Returning back to FIG. 1, assessing intensity images and or full field QPIs may include additional application of image analysis algorithms that occur during post processing at block S152. In some embodiments, image analysis may be used to detect one or more distinctive features of interest that are used to evaluate a sample as for application herein. Distinctive image features may be identified using a variety of techniques for extracting one or more distinctive invariant features. Distinctive invariant features may be identified using Scale-Invariant Key points, as described herein. Image features may be extracted using Scale-Invariant Key points, and then applied later for image matching for the purposes of identifying, classifying, or contextualizing the subject matter and information presented in images. Scale Invariant Key points may comprise image features that have properties that are suitable for matching differing images of an object or a scene.

To reduce the time and computational cost of feature detection in image analysis, a cascade filtering approach may be used to efficiently extract features. Without wishing to be bound by theory, a cascade filtering approach (e.g., scale invariant feature transform, SIFT) relies on multiple stages of computation to generate a set of image features and performs a series of evaluations such that the more expensive operations are applied only at locations that pass an initial test or series of tests. The set of image features may be generated using one or more of the following steps: scale-space extrema detection, key point localization, orientation assignment, and key point descriptor, as described herein. These steps may be used as part of a method for image detection, wherein these steps are applied to identify features that are invariant to image scaling and rotation and partially invariant to change in illumination and camera viewpoint. The selected features are selected so that they are well localized in both the spatial and frequency domains, thus reducing the likelihood of disruptive effects like occlusion, clutter, or noise.

In some embodiments, feature identification may include key point localization. Key point localization may be applied to each candidate location, fitting a detailed model to determine location and scale. Key points may be selected based on one or more parameters or measurements for assessing stability.

In some embodiments, blob detection protocols may be used to identify key cellular architecture needed for assessment of sample quality. Blob detection methods may include detecting regions in a digital image that differ in properties, such as brightness or color, compared to surrounding regions. A blob as disclosed herein, is a region of an image in which some properties are constant or approximately constant, and wherein one or more parameters can be applied such that all the points in a blob may be considered as similar to each other. Parameters or operations for performing governing blob detection may comprise: thresholding, grouping, merging, and/or performing radius calculations. Thresholding as defined herein includes converting one or more source images to several binary images by thresholding the one or more source images with thresholds starting at a minimal threshold (e.g., minThreshold). These thresholds may be incremented by threshold steps (e.g., thresholdStep) until a maximum threshold is reached (e.g., maxThreshold). As such, the first threshold is minThreshold, the second is minThreshold+thresholdStep, the third is minThreshold+2×thresholdStep, and so on. Grouping may also be performed, for example when connected white pixels are grouped together in each binary image (i.e., binary blobs). Another operation that may be applied is merging. Merging may be applied when the centers of the binary blobs in the binary images are computed, and blobs located closer than a minimum distance between blobs allowing the blobs below that minimum distance to be merged. Radius Calculations may also be performed, for example when the centers and radii of the new merged blobs are computed and returned. Calculations may be done in combination with Fast Radial Symmetry Detection with affine transforms (FRS). FRS utilizes local radial symmetry to highlight points of interest within a scene or image. In some embodiments, FRS methods may be applied with a general fixed parameter set; in other embodiments, FRS methods may be tuned to exclusively detect particular kinds of features including, but not limited to, nuclei, membranes, cellular organelles, and appendages. Systems, devices and methods disclosed herein may be configured to determine the contribution each pixel makes to the symmetry of pixels around it, rather than considering the contribution of a local neighborhood to a central pixel.

In some embodiments, key architectural features for sample/image assessment may be identified via a two-dimensional isotropic measure of the second spatial derivative of an image, or Laplacian. The Laplacian of an image highlights regions of rapid intensity change and may therefore be used for edge detection. The systems, devices, and methods disclosed herein may be configured to receive a single grayscale image as input and produce a second grayscale image as output. Since the input image is represented as a set of discrete pixels, a discrete convolution kernel may be used to approximate the second derivatives in the definition of the Laplacian. Having defined the Laplacian using a negative peak, it is equally valid to use the opposite sign convention. Methods as applied herein can comprise application of a two-dimensional Laplacian of Gaussian (LoG) to calculate the second spatial derivative of an image such that in areas where the image has a constant intensity (i.e., where the intensity gradient is zero), the LoG response will be zero and in the vicinity of a change in intensity, the LoG response will be positive on the darker side, and negative on the lighter side thereby providing a sharp edge between two regions of uniform but different intensities. The results of the Laplacian may be integrated such that the results of the imaging are used to make a determination of the sample, for example classification of the sample based on one or more inputs of the sample including inputs provided by the user of the system (e.g., sample type, age of sample, parameters about the sample collection of the patient from which the sample was collected). In some embodiments, deductions based on the Laplacian and classification performed based on the sample type may guide subsequent steps of the method for sample assessment, and/or features of functions of the device or system to gather additional content based on the results of the analysis of the sample edge (e.g., re-testing the sample, changing illumination angles, sample distance from detection or illumination source, changes in orientation of sample, patterns of illumination, wavelength of light in the illumination, etc.).

In some embodiments, once the cells have been properly identified and categorized by the presence or absence of nuclei, the methods may include grouping nucleated cells that have contiguous membranes as identified by the Laplacian calculations outlined elsewhere herein. If a contiguous membrane is identified, the method may be applied to identify or define the cells involved as a cell cluster. In instances where the cell cluster comprises ten or more nucleated cells, then the cluster may be classified as meeting the six requisite clusters necessary to deem that a given sample is adequate for diagnostic workup.

In further embodiments, a method for assessing a sample may comprise analyzing one or more images of the biological sample using methods for comparing, contrasting, compiling, connecting, and/or otherwise associating two or more images of a sample, as described elsewhere herein, to generate information or context that may be used to perform an assessment on the biological sample.

Referring back to FIG. 1, in some embodiments, low resolution images, high or low resolution QPI's, and/or information obtained during post processing (e.g., feature extraction) may be evaluated for the desired criteria using machine learning algorithms, deep learning algorithms, or a combination thereof for computer-assisted evaluation (see block S154). For example, algorithms may be deployed to determine sample adequacy based on predetermined criteria. In other embodiments, algorithms may be trained to identify cell types and/or abnormalities and in some embodiments, return a classification. For example, a whole slide image acquired using ptychography may be fed into a machine learning or deep learning model for training to detect adequacy. Additionally or alternatively, clusters may be assessed for adequacy based on clusters identified in regions of interest by a first machine learning or deep learning layer or model. Additionally or alternatively, computer vision for the first machine learning or deep learning model or layer and/or a second machine learning or deep learning model or layer may be used to classify regions of interest and adequacy based on the six clumps of ten nucleated cells.

Figure 31:
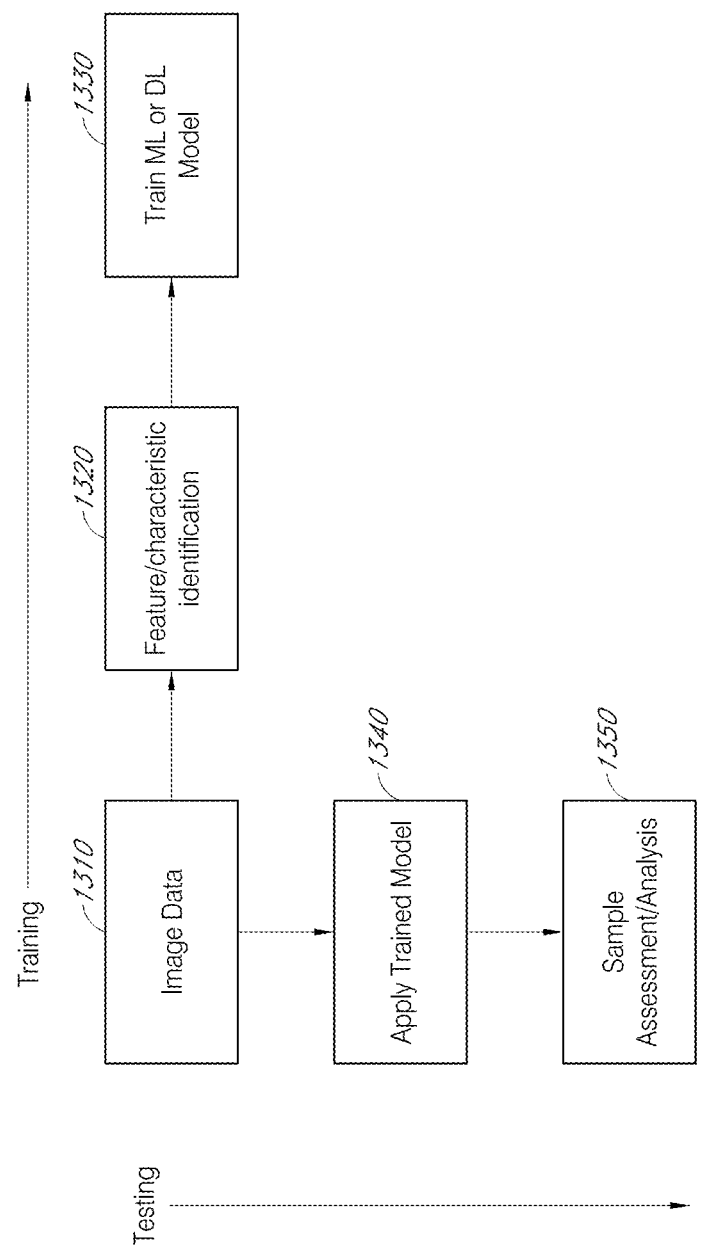
FIG. 31 shows a schematic of a generalized method for assessing a sample using one or more machine learning or deep learning models.

A general schematic for developing and implementing machine learning or deep learning algorithms is shown in FIG. 31. In general, image data at block S1310 with known characteristics, termed labels, are used to train a machine learning or deep learning model. In some embodiments, features at block S1320 used to train one or more machine learning or deep learning models at block S1330 may include features identified using computer vision methods herein, manually annotated features, or a combination thereof. In some embodiments, these features may be used as criteria to train classification machine learning or deep learning models in supervised learning. In some instances, unsupervised deep learning methods may be combined with the supervised learning models to generate multilayer models. In some embodiments, base classification models serve as training data for deep learning classification models. In some embodiments, deep learning architecture may be used to evaluate samples from raw data or unannotated image data, without manual feature extraction. In some embodiments, featureless/unsupervised learning convolutional neural networks may be trained where each neuron will act as a learned feature detector. Models may further by trained using external databases, seed models, and other input including relevant sample identity and medical data. In some embodiments, models may be informed using other information including, but not limited to, demographics such as socioeconomic, geographic, or similar indicators.

In some embodiments, one or more trained machine learning or deep learning models may be used to evaluate or test data and images not used in the model development to inform a user of a desired sample characteristic. In some embodiments, the trained models may be applied to images/data at block S1340 resulting in a computer-assisted assessment at block S1350. In some embodiments, the trained models may be static and therefore unchanged with the addition of new data. In some embodiments, the models may continue to evolve to improve accuracy through additional data and user feedback.

In any of the preceding embodiments, a digital stain (as opposed to a physical stain) may be applied to the image prior to an assessment. In such embodiments, the method may include colorizing one or more images of the image stack, and optionally, outputting the colorized one or more images of the image stack (or final reconstruction). The colorizing may be performed by a deep learning model trained to simulate immunohistochemical stains based on phase delay through the biological sample. The colorized image(s) may be analyzed for any of the biological or cellular characteristics described herein such that the system may output an indication of the biological sample. Exemplary, non-limiting examples of indications include: a disease state, a tissue type, a cellular characteristic, a quality of cells, a quantity of cells, and a type of cells. Exemplary, non-limiting examples of cellular characteristic include: an atypical mitoses, a chromatin granularity, a chromatin hyperchromasia, a nuclei number, a nuclear size, a mitoses, a nuclear membrane irregularities, a nuclear pleomorphism, a nuclear-to-cytoplasmic ratio, a nucleoli shape, a nucleoli size, a cell division rates, a spindle length, and a cellular membrane density.

Further for example, ML assessment of images in FIG. 1 (see block S154) may include digitally staining the image of a sample. Quantitative phase images of label-free samples may be fed into pre-trained deep learning models to produce digitally stained images equivalent to physically immunohistochemically stained samples viewed via brightfield microscopy. The digital staining model is trained through feeding pairs of image data (QPI and the corresponding brightfield images, acquired after staining) into a generative adversarial network comprising two deep neural networks—a generator and a discriminator. The generator may generate an output image (using the QPI) with the same features as the target stained (brightfield image) while the discriminator may distinguish between the target and output images. The GAN may perform successive iterations using the competing neural networks until an equilibrium is achieved, at which point training is considered successful, and data withheld from the training phase of the model can be used to evaluate how well the model generalizes. The resulting trained model can accurately digitally stain quantitative phase images of label-free samples for a variety of immunohistochemical stains, including but not limited to, Hematoxylin and Eosin, Jones' stain, and Masson's trichrome, Papanicolaou stain, and Diff-Quik stains.

Digitally stained sample images are generated from reconstructed phase and intensity of the image obtained in FIG. 1 at block S152. Intensity, phase, sample type and preparation, and other clinically relevant information may be used to inform the algorithm. Alternatively, phase and intensity data may be used to determine which specimens are being examined in the current field of view via a machine learning model or deep learning model. Using the information given by the model, in conjunction with the information from phase and intensity of the image, the phase image may be colored in such a way that it mimics what would be seen using one or more phase staining solutions under a phase contrast microscope. One or more digitally stained images may be displayed to a user for interpretation. In some embodiments, the user may cycle through or overlay multiple digital stains applied to the same image(s) for comparison.

Returning to FIG. 1, outputs of sample evaluation may be displayed to a user via an external or embedded user interface at block S160. In some embodiments, outputs include the results of sample evaluation including, but not limited to, digital images and/or computer-assisted assessments. In some embodiments, the user interface may include additional functionality that aligns system capabilities with existing user requirements, in addition to extending functionality to aid in user productivity and efficacy.

Figure 33:
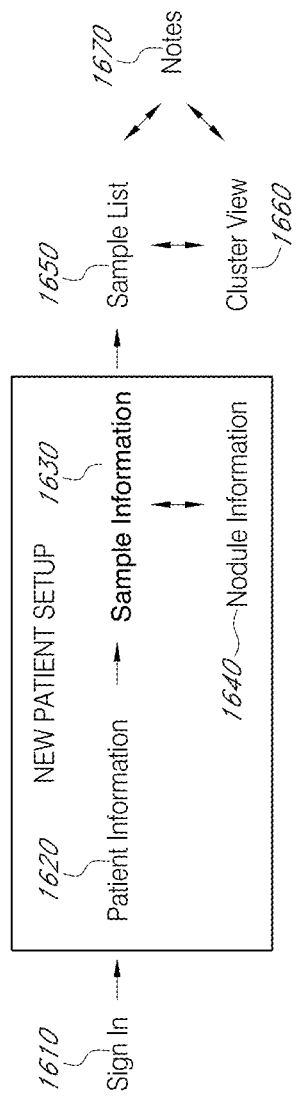
FIG. 33 is a flow diagram of a user interface for a device for analyzing a sample.

In some embodiments, user interface functionality may include systems that aid in point-of-care sample classification. FIG. 33 outlines an exemplary system user flow for sample classification and nodule localization. The first step in the proposed flow, block S1610, is to have the operator log-in with secure single sign-on (SSO) interface. This SSO interface requires the clinical credentials as required by the institution. These credentials may include, but are not limited to, name, password, identification number, RFID chip, barcode, fingerprint scanner, facial recognition, retinal recognition, verbal identification, or QR code. This information can be provided to the system with a user input device, such as a keyboard, voice recording, natural language processing, laser scanner, encoder, imaging sensor, or touch screen. Moving to block S1620, upon verification that the correct operator is logged-in, the user is then prompted to identify the patient with the institution's preferred method of patient record tracking. These systems may require the user to input one or more patient identifiers such as legal name, date of birth, social security number, hospital identification number, barcode, fingerprint, or QR code. These data points provided to the system will serve to direct the connection to the proper portal in the electronic health record. Once the user and the patient are properly identified, the system will confirm that it has successfully connected with the institution's electronic health record and instruct the operator to begin the procedure. In one embodiment, the system described in FIG. 33, will instruct the operator to input sample information at block S1630. For example, the user may select the tissue or sample type that is intended to be processed by the system, for example thyroid FNA, lung FNA, Pancreas FNA, skin scraping, pap smear, lung washing, urine (clean or dirty catch), joint aspirate, brain touch preparation, etc. The user may also, optionally, be prompted to select a machine learning, deep learning, or computer vision software package that will assist in the assessment or diagnosis of a sample. Next, the system in FIG. 33 may prompt the user to input information regarding the area of interest at block S1640. In one embodiment, this information may be provided by having the operator select the location of the nodule on the frontal plane followed by its location on the transverse plane resulting in a three-dimensional localization of the area of interest S1650. This is followed by the operator selecting the size, shape, and/or radiographic characteristics of the designated area of interest. This input cycle will repeat for each area of interest identified by the operator. Another embodiment of this system could have the radiographic imaging data fed directly into the system via wired or wireless transmission to automatically populate the fields of interest. As the procedure progresses, the system may store the image data on unit for rapid recall of image data to view and compare samples immediately. For each sample imaged by the system, the operator may be presented a visual representation of the sample. This image may be presented as a single whole slide image along a single magnification focal plane with the ability to pan and digitally zoom in and out. Another embodiment may have the image sub segmented within any magnification from 1× to 2000×. These segmented magnification planes can be arranged in a pyramidal structure and separately loaded as the operator increases and decreases the digital zoom or pans across the image. One or more of these distinct layers may be concurrently loaded to allow for rapid shifts in magnification. Another embodiment may have the system identify regions of interest from either the raw image data or the reconstructed image and selectively load these regions as independent islands loaded in either a single magnification plane or a pyramidal view at block S1660. These regions of interest may be identified by either machine learning, deep learning, or computer vision techniques. The system may create a ranking of areas of interest to direct the operator's attention. The operator may have the ability to rapidly cycle between the pre-classified areas of interest by panning, zooming, or rotating an encoder. The operator may have the ability to insert annotations that are layered on top of or embedded into the image. One embodiment of this annotation technique may have the operator outline the region being annotated. Another embodiment may have the operator highlight an area of interest. Another embodiment may have the operator select a predefined shape to overlay on an area of interest. Another embodiment may have the operator approve an area of interest visually identified by the system. All of these methods of visual annotation may be accompanied by a method of note taking that may or may not be stored along with the raw image data at block S1670. The operator may be presented with a system generated sample assessment, prognosis, criteria checklist, feature identification, or diagnosis. The system may upload the raw image data, one or more reconstructed fields of view, the reconstructed whole slide image, the annotation data, and/or the system generated results to a local or cloud infrastructure, for example server 220 in FIG. 1. This infrastructure may allow for remote or retrospective viewing of individual samples, comparing samples from the same case, comparing samples from different cases of the same patient, or comparing cases between patients. These data can also be made available for distribution between operators within a single organization or shared between organizations for rapid collaborative viewing and further annotation.

In some embodiments, a graphical user interface (GUI) (e.g., user interface, user experience) of the system may include a Push to EHR functionality. Electronic health information recorded on or by the device may be transmitted over a secure connection to the internet or a local network. Secure connections may be encrypted with a private and/or public key, block chain, or any other common method of data transference in a secure way, both classically or utilizing quantum encryption. The data transmitted may contain sensitive patient information in the form of an identification string, number, or other account linking identifier. The identifier may be used to link the data recorded on the system and transmitted through a secure connection to an already existing patient record or may be used to create a new patient record. Information from an electronic health record may be sent over the internet or local network via a secure connection. Information pertaining to the electronic health records may be sent to the device from a trusted site using authentication techniques, such as decoding an encrypted message from a known site using a private key, or other known methods for verifying a trusted site from a connection. The information from an electronic health record system may contain sensitive patient information and may have an identifier as mentioned elsewhere herein.

In some embodiments, the GUI may integrate with a local or cloud-based server for data management and viewing. In some embodiments, cloud-based data viewing and management enables data to be presented remotely. For example, images and data may be archived, stored, edited within, and displayed in an electronic health record (EHR), a medical device data system (MDDS), or picture archiving and communication system (PACS).

In some embodiments, the GUI may allow for remote or local data viewing of a single panel presentation of computational microscopy images and data, with at least 8-bit depth for either color, greyscale, or some combination thereof. Images may be presented on a display with or without high dynamic range (HDR) on the device or appended to the device. In some implementations, computational microscopy data may be displayed in a color space wider than Rec 709 such as Adobe RGB, sRBG, DCI-P3, HDR 10+, Dolby Vision HDR, Vesa Display HDR and Rec 2020. In some embodiments, computational microscopy data may be displayed on a device, component, or subsystem with pixel density of 50-900 pixels per inch (PPI).

In some embodiments, the GUI may allow for remote or local data viewing of a multi-panel presentation of computational microscopy images and data. Computational microscopy images and data, of at least 8-bit depth for either color, greyscale, or some combination thereof, may be displayed on a series of displays with or without high dynamic range (HDR) on the device, worn by the user (head mounted display), or appended to the device. One implementation of this is a duality of aforementioned displays (binocular displays) within the device, enabling the augmented, three-dimensional, or virtual reality display of computational microscopy images and data on the device. One implementation of this is a duality of aforementioned displays mounted to the head of the end user (binocular head-mounted displays with or without stereo vision) enabling the augmented, three-dimensional, or virtual reality display of computational microscopy data remotely.

In some embodiments, the GUI may be configured to accept feedback from a user to manipulate images and data. Computational microscopy images and data may be manipulated via a number of rotary encoders or directional pads with press button functionality and directional sensing (e.g., x, y translation). In one embodiment, data and image manipulation may occur via a single rotary encoder, wherein physical manipulation results in image manipulation. Some non-limiting examples of this functionality may include: rotation of the encoder manipulates the zoom of the image; depression of the encoder (a "click" or "press") and subsequent rotation of the encoder opens a menu, selects, and/or toggles ancillary features and data (e.g. visibility); and directional translation or two-dimensional input of the encoder manipulates the visible X-axial and Y-axial coordinates of the image (i.e., the position of the image).

In another embodiment, data and image manipulation may occur with two rotary encoders, a left (L) and right (R) encoder, wherein physical manipulation results in image manipulation. Some non-limiting examples of this functionality may include: a rotation of the left (L) encoder manipulates the Y-translation of the image and a rotation of the right (R) encoder manipulates the X-translation of the image or vice versa; a press and subsequent rotation of the left (L) encoder manipulates the zoom of the image in large step sizes and a press and subsequent rotation of the right (R) encoder manipulates the zoom of the image in ultra-fine step sizes or vice versa; and a press of both left (L) and right (R) encoders opens a menu in which selection and toggle of ancillary features and data (e.g., visibility) are facilitated by the rotary encoders.

In some embodiments, the same user interface interactions between user and data and/or images may be accomplished with one or more analog or digital directional pads, mice, motion sensors (e.g., Microsoft Kinect), keyboards, or any other remote or locally connected digital or analog device/system.

In some embodiments, the GUI may be configured to accept touch screen feedback from a user to manipulate images and data. Some non-limiting examples of this functionality may include: a double-tap on the right side of the screen displays the next sample image or region of interest, double-tap on the left side of the screen displays the previous sample image or region of interest, etc.

In some embodiments, systems may include functionality that supports Just-in-time Compiling of Image Data. In some embodiments, the system may present data to an EHR, PACS, or MDDS in the form of an interoperable, tiled, lossless, and/or progressive image format. The image(s) may include metadata, attributes, look-up-table (s), and accompanying medical information. Image file formats may be stored at rest in progressive image formats until queried for and then converted in real-time to a medical imaging format (e.g., DICOM) upon request by the user, MDDS, PACS, or EHR. Medical data associated with the image may be stored in a separate format until requested by the user, MDDS, PACS, or her. Upon request, the progressive image format and related data will be aggregated, combined, and/or converted into a medical image format with metadata such as DICOM. This run-time conversion of images and associated medical data stores progressive and lossless image data at rest and creates an interoperable, medical-compatible, and tiled format upon request.

Figure 34:
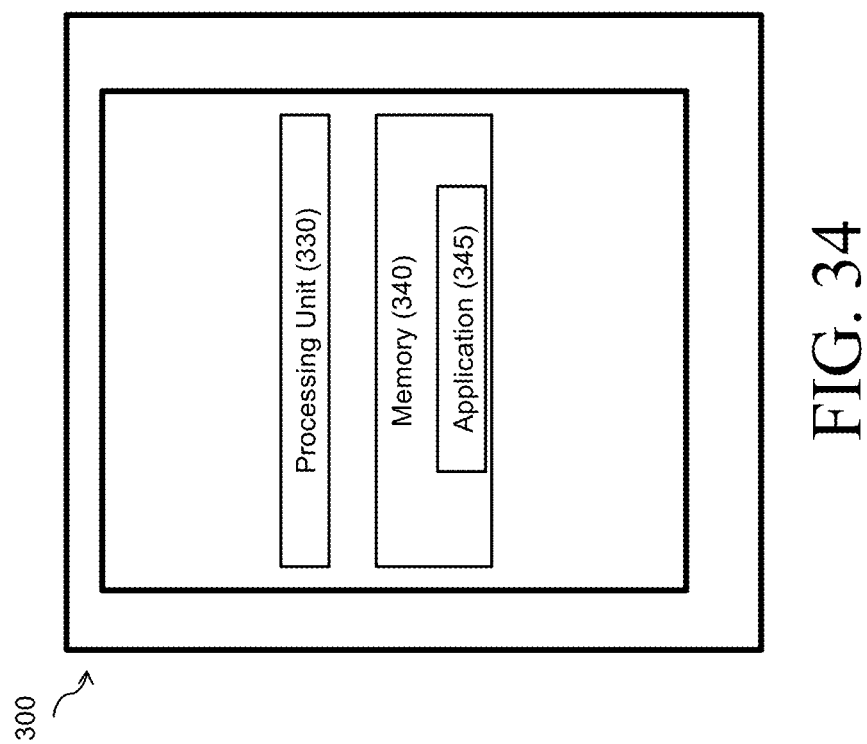
FIG. 34 shows a schematic of a generalized processor and memory.

As shown in FIG. 34, the systems and methods of the preferred embodiment and variations thereof can be embodied and/or implemented at least in part as a machine 300 configured to receive a computer-readable medium storing computer-readable instructions. The instructions are preferably executed by computer-executable components preferably integrated with the system 300 and one or more portions of the processor 330 on the device or system 300 for sample analysis and/or computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

As shown in FIG. 34, the processor 330 is coupled, via one or more buses, to the memory 340 in order for the processor 330 to read information from and write information to the memory 340. The processor 330 may additionally or alternatively contain memory 340. The memory 340 can include, for example, processor cache. The memory 340 may be any suitable computer-readable medium that stores computer-readable instructions for execution by computer-executable components. In various embodiments, the computer-readable instructions include application software 345 stored in a non-transitory format. The software, when executed by the processor 330, causes the processor 330 to perform one or more methods described elsewhere herein.

Various exemplary embodiments will now be described.

In any of the preceding embodiments, a method performed by a near-field Fourier ptychographic system for assessing a biological sample includes: characterizing a speckled pattern to be applied by a diffuser; positioning a biological sample relative to at least one coherent light source such that at least one coherent light source illuminates the biological sample; diffusing light produced by the at least one coherent light source, such that the light is diffused in the speckled pattern either before the light interacts with the biological sample or after the light has interacted with the biological sample; capturing a plurality of illuminated images with the embedded speckle pattern of the biological sample based on the diffused light; iteratively reconstructing the plurality of speckled illuminated images of the biological sample to recover an image stack of reconstructed images; stitching together each image in the image stack to create a whole slide image, wherein each image of the image stack at least partially overlaps with a neighboring image; and identifying one or more features of the biological sample, wherein the one or more features are selected from a group consisting of: cell count, nucleus, edges, groupings, clump size, and a combination thereof.

In any of the preceding embodiments, the at least one coherent light source is a laser diode.

In any of the preceding embodiments, the method further includes directing the diffused light towards the biological sample using a reflective medium.

In any of the preceding embodiments, the method further includes modulating, using a motion control device, the reflective medium to modulate the reflective medium to direct the diffused light towards the biological sample.

In any of the preceding embodiments, the motion control device is a galvanometer.

In any of the preceding embodiments, the method further includes receiving, using a numerical aperture lens, the light from the at least one coherent light source and transmitting the light to the diffuser.

In any of the preceding embodiments, the method further includes selecting one or more of: a pattern of illumination, a frequency of illumination, a wavelength of illumination, or a combination thereof of the at least one coherent light source based on one or more features of the biological sample.

In any of the preceding embodiments, one or more features include: a sample type, a sample age, a sample application, or a combination thereof.

In any of the preceding embodiments, the method further includes focusing, using a condenser, the diffused light onto the biological sample.

In any of the preceding embodiments, the overlap between neighboring images is about 1% to about 50%.

In any of the preceding embodiments, capturing the plurality of images is performed by a sensor.

In any of the preceding embodiments, the sensor is a negative channel metal oxide semiconductor.

In any of the preceding embodiments, the sensor is configured to capture at least 6 bits of grayscale intensity.

In any of the preceding embodiments, the method further includes focusing the diffused light transmitted through the biological sample onto the sensor.

In any of the preceding embodiments, focusing is performed by an objective lens.

In any of the preceding embodiments, the method further includes moving step-wise, using a motion control device, the biological sample relative to the at least one coherent light source.

In any of the preceding embodiments, the method further includes focusing light from the at least one coherent light source onto a diffuser.

In any of the preceding embodiments, focusing is performed by a lens.

In any of the preceding embodiments, stitching comprises matching key points across one or more overlapped regions of the reconstructed images.

In any of the preceding embodiments, the image reconstruction is performed by an FPGA.

In any of the preceding embodiments, the method further includes determining an adequacy of the biological sample.

In any of the preceding embodiments, determining an adequacy of the biological sample includes determining whether the biological sample comprises six clusters of ten nucleated cells.

In any of the preceding embodiments, determining an adequacy of the biological sample includes determining whether the biological sample comprises a predetermined number of cells or clusters.

In any of the preceding embodiments, determining an adequacy of the biological sample further includes selecting, using a machine learning or deep learning model, one or more regions of interest based on a presence of one or more clusters; and assessing, using the machine learning or deep learning model, the adequacy of the biological sample.

In any of the preceding embodiments, determining an adequacy of the biological sample further includes selecting one or more regions of interest based on a presence of one or more clusters; and classifying, using computer vision, the one or more regions of interest based on the adequacy in each region of interest.

In any of the preceding embodiments, determining an adequacy of the biological sample is performed by a machine learning or deep learning model trained to detect adequacy.

In any of the preceding embodiments, the method further includes outputting an indication of the adequacy.

In any of the preceding embodiments, diffusing is performed by a diffuser.

In any of the preceding embodiments, the method further includes applying a defocus mask to the whole slide image.

In any of the preceding embodiments, the method further includes colorizing one or more images of the image stack.

In any of the preceding embodiments, colorizing is performed by a deep learning model trained to simulate immunohistochemical stains based on phase delay through the biological sample.

In any of the preceding embodiments, the method further includes outputting the one or more colorized images of the image stack.

In any of the preceding embodiments, the method further includes analyzing the one or more colorized images and outputting an indication of the biological sample.

In any of the preceding embodiments, the indication is one or more of: a disease state, a tissue type, a cellular characteristic, a quality of cells, a quantity of cells, and a type of cells.

In any of the preceding embodiments, the cellular characteristic includes one or more of: an atypical mitoses, a chromatin granularity, a chromatin hyperchromasia, a nuclei number, a nuclear size, a mitoses, a nuclear membrane irregularities, a nuclear pleomorphism, a nuclear-to-cytoplasmic ratio, a nucleoli shape, a nucleoli size, a cell division rates, a spindle length, and a cellular membrane density.

In any of the preceding embodiments, a method performed by a far-field Fourier ptychographic system for assessing a biological sample includes: positioning a biological sample relative to an illumination source such that the biological sample is backlit; applying light to the biological sample from the illumination source in rapid succession, wherein the illumination source is configured to generate incident rays of light when applied to the biological sample; projecting the diffraction pattern of the incident rays of light onto a sensor; collecting one or more diffraction patterns generated from an optical transmission function of the biological sample to reconstruct the original optical transmission function of the biological sample; stitching images together by matching key points across the overlapped regions of the sample images; and identifying one or more features of the biological sample, wherein the one or more features are selected from a group consisting of: cell count, nucleus, edges, groupings, clump size, and a combination thereof.

In any of the preceding embodiments, the illumination source comprises an LED array.

In any of the preceding embodiments, the one or more diodes in the LED array are positioned in one or more planes.

In any of the preceding embodiments, the one or more diodes are irregularly spaced in the one or more planes.

In any of the preceding embodiments, the one or more diodes in the LED array are arranged in one or more concentric circles.

In any of the preceding embodiments, the method further includes applying light, using the illumination source, to the biological sample, from at least two point sources at an angle of 180 degrees from each other, wherein the at least two point sources are configured to generate incident rays of light when applied to the biological sample; and collecting one or more focus maps generated from the biological sample.

In any of the preceding embodiments, the illumination source comprises a 5×5 to 40×40 grid of point light sources.

In any of the preceding embodiments, the array of point light sources emits electromagnetic radiation at wavelengths of 700-635 nm, 560-520 nm, 490-450 nm, and 495-570 nm.

In any of the preceding embodiments, the point light sources illuminate the biological sample one at a time or in combination.

In any of the preceding embodiments, the light applied by the illumination source is transmitted through the biological sample so that the diffraction pattern formed is projected onto the sensor.

In any of the preceding embodiments, the resulting diffraction pattern is multiplexed for the detection of coherent-state decomposition.

In any of the preceding embodiments, frequency mixing between the biological sample and the structured light shifts the high frequency biological sample information to a passband of the sensor.

In any of the preceding embodiments, the image reconstruction is performed by an FPGA.

In any of the preceding embodiments, the method further includes selecting one or more of: a pattern of illumination, a frequency of illumination, a wavelength of illumination, or a combination thereof of the illumination source based on one or more features of the biological sample.

In any of the preceding embodiments, the one or more features comprise: a sample type, a sample age, a sample application, or a combination thereof.

In any of the preceding embodiments, the method further includes determining an adequacy of the biological sample by determining whether the biological sample comprises six clusters of ten nucleated cells.

In any of the preceding embodiments, determining an adequacy of the biological sample further includes selecting, using a machine learning or deep learning model, one or more regions of interest based on a presence of one or more clusters; and assessing, using the machine learning or deep learning model, the adequacy of the biological sample.

In any of the preceding embodiments, determining an adequacy of the biological sample further includes selecting one or more regions of interest based on a presence of one or more clusters; and classifying, using computer vision, the one or more regions of interest based on the adequacy in each region of interest.

In any of the preceding embodiments, determining an adequacy of the biological sample is performed by a machine learning or deep learning model trained to detect adequacy.

In any of the preceding embodiments, the incident rays are oblique incident rays.

In any of the preceding embodiments, a near-field Fourier ptychographic system for assessing a biological sample includes: at least one coherent light source configured to illuminate a biological sample positioned relative to the at least one coherent light source; a diffuser configured to diffuse light produced by the at least one coherent light source, wherein the light is diffused in a speckled pattern either before the light interacts with the biological sample or after the light has interacted with the biological sample; a sensor configured to capture a plurality of illuminated images with an embedded speckle pattern based on the diffused light; and a processor and a non-transitory computer-readable medium with instructions stored thereon, wherein the processor is arranged to execute the instructions, the processor being further arranged to: characterize a speckled pattern to be applied by the diffuser, iteratively reconstruct the plurality of speckled illuminated images of the biological sample to recover an image stack of reconstructed images, stitching together each image in the image stack to create a whole slide image, wherein each image of the image stack at least partially overlaps with a neighboring image, and identify one or more features of the biological sample, wherein the one or more features are selected from a group consisting of: cell count, nucleus, edges, groupings, clump size, and a combination thereof.

In any of the preceding embodiments, the at least one coherent light source is a laser diode.

In any of the preceding embodiments, the system further includes a reflective medium configured to direct the diffused light towards the biological sample.

In any of the preceding embodiments, the system further includes a motion control device configured to modulate the reflective medium to direct the diffused light towards the biological sample.

In any of the preceding embodiments, the motion control device is a galvanometer.

In any of the preceding embodiments, the system further includes a numerical aperture lens configured to receive the light from the at least one coherent light source and transmit the light to the diffuser.

In any of the preceding embodiments, the processor is further arranged to select one or more of: a pattern of illumination, a frequency of illumination, a wavelength of illumination, or a combination thereof of the at least one coherent light source based on one or more features of the biological sample.

In any of the preceding embodiments, the one or more features comprise: a sample type, a sample age, a sample application, or a combination thereof.

In any of the preceding embodiments, the system further includes a condenser configured to focus the diffused light onto the biological sample.

In any of the preceding embodiments, the overlap between neighboring images is about 1% to about 50%.

In any of the preceding embodiments, the sensor is a negative channel metal oxide semiconductor.

In any of the preceding embodiments, the sensor is configured to capture at least 6 bits of grayscale intensity.

In any of the preceding embodiments, the system further includes an objective lens configured to focus the diffused light transmitted through the biological sample onto the sensor.

In any of the preceding embodiments, the system further includes a motion control device configured to move stepwise the biological sample relative to the at least one coherent light source.

In any of the preceding embodiments, the system further includes a lens configured to focus light from the at least one coherent light source onto the diffuser.

In any of the preceding embodiments, the processor is further arranged to match key points across one or more overlapped regions of the reconstructed images.

In any of the preceding embodiments, the processor is further arranged to determine an adequacy of the biological sample.

In any of the preceding embodiments, the processor is further arranged to determine whether the biological sample comprises six clusters of ten nucleated cells.

In any of the preceding embodiments, the processor is further arranged to determine whether the biological sample comprises a predetermined number of cells or clusters.

In any of the preceding embodiments, the processor is further arranged to select, using a machine learning or deep learning model, one or more regions of interest based on a presence of one or more clusters; and assess, using the machine learning or deep learning model, the adequacy of the biological sample.

In any of the preceding embodiments, the processor is further arranged to select one or more regions of interest based on a presence of one or more clusters; and classify, using computer vision, the one or more regions of interest based on the adequacy in each region of interest.

In any of the preceding embodiments, the processor includes a machine learning or deep learning model trained to detect adequacy.

In any of the preceding embodiments, the processor is further arranged to output an indication of the adequacy.

In any of the preceding embodiments, the processor is further arranged to apply a defocus mask to the whole slide image.

In any of the preceding embodiments, the processor is further arranged to colorize one or more images of the image stack.

In any of the preceding embodiments, the processor includes a deep learning model trained to simulate immunohistochemical stains based on phase delay through the biological sample.

In any of the preceding embodiments, the processor is further arranged to output the colorized one or more images of the image stack.

In any of the preceding embodiments, the processor is further arranged to analyze the colorized one or more images and outputting an indication of the biological sample.

In any of the preceding embodiments, the indication is one or more of: a disease state, a tissue type, a cellular characteristic, a quality of cells, a quantity of cells, and a type of cells.

In any of the preceding embodiments, the cellular characteristic includes one or more of: an atypical mitoses, a chromatin granularity, a chromatin hyperchromasia, a nuclei number, a nuclear size, a mitoses, a nuclear membrane irregularities, a nuclear pleomorphism, a nuclear-to-cytoplasmic ratio, a nucleoli shape, a nucleoli size, a cell division rates, a spindle length, and a cellular membrane density.

In any of the preceding embodiments, a far-field Fourier ptychographic system for assessing a biological sample includes: an illumination source positioned relative to a biological sample such that the biological sample is backlit, wherein the illumination source is configured to apply light to the biological sample in rapid succession, and wherein the illumination source is configured to generate incident rays of light when applied to the biological sample; a sensor configured to capture a plurality of images based on one or more diffraction patterns generated from an optical transmission function of the biological sample; a lens configured to project the one or more diffraction patterns onto the sensor; and a processor and a non-transitory computer-readable medium with instructions stored thereon, wherein the processor is arranged to execute the instructions, the processor being further arranged to: reconstruct the original optical transmission function of the biological sample, stitch the plurality of images together by matching key points across one more overlapping regions of the plurality of images, and identify one or more features of the biological sample, wherein the one or more features are selected from a group consisting of: cell count, nucleus, edges, groupings, clump size, and a combination thereof.

In any of the preceding embodiments, the illumination source comprises an LED array.

In any of the preceding embodiments, one or more diodes in the LED array are positioned in one or more planes.

In any of the preceding embodiments, the system further includes the one or more diodes are irregularly spaced in the one or more planes.

In any of the preceding embodiments, one or more diodes in the LED array are arranged in one or more concentric circles.

In any of the preceding embodiments, the illumination source comprises at least two point sources at an angle of 180 degrees from each other, wherein the at least two point sources are configured to generate incident rays of light when applied to the biological sample.

In any of the preceding embodiments, the processor is further arranged to collect one or more focus maps generated from the biological sample.

In any of the preceding embodiments, the illumination source comprises a 5×5 to 40×40 grid of point light sources.

In any of the preceding embodiments, the array of point light sources emits electromagnetic radiation at wavelengths of 700-635 nm, 560-520 nm, 490-450 nm, and 495-570 nm.

In any of the preceding embodiments, the point light sources illuminate the biological sample one at a time or in combination.

In any of the preceding embodiments, the light applied by the illumination source is transmitted through the biological sample so that the diffraction pattern formed is projected onto the sensor.

In any of the preceding embodiments, the resulting diffraction pattern is multiplexed for the detection of coherent-state decomposition.

In any of the preceding embodiments, frequency mixing between the biological sample and the structured light shifts the high frequency biological sample information to a passband of the sensor.

In any of the preceding embodiments, the processor comprises more than one processor.

In any of the preceding embodiments, the processor includes an FPGA configured to perform the image reconstruction.

In any of the preceding embodiments, the processor is further arranged to select one or more of: a pattern of illumination, a frequency of illumination, a wavelength of illumination, or a combination thereof of the illumination source based on one or more features of the biological sample.

In any of the preceding embodiments, the one or more features comprise: a sample type, a sample age, a sample application, or a combination thereof.

In any of the preceding embodiments, the processor is further arranged to determine an adequacy of the biological sample by determining whether the biological sample comprises six clusters of ten nucleated cells.

In any of the preceding embodiments, the processor is further arranged to select, using a or deep learning model, one or more regions of interest based on a presence of one or more clusters; and assess, using the machine learning or deep learning model, the adequacy of the biological sample.

In any of the preceding embodiments, the processor is further arranged to select one or more regions of interest based on a presence of one or more clusters; and classify, using computer vision, the one or more regions of interest based on the adequacy in each region of interest.

In any of the preceding embodiments, the processor includes a machine learning or deep learning model trained to detect adequacy.

In any of the preceding embodiments, the incident rays are oblique incident rays.

As used in the description and claims, the singular form "a", "an" and "the" include both singular and plural references unless the context clearly dictates otherwise. For example, the term "illumination source" may include, and is contemplated to include, a plurality of illumination sources. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method performed by a far-field Fourier ptychographic system for assessing a biological sample, comprising:
   positioning a biological sample relative to an illumination source such that the biological sample is backlit;
   applying light to the biological sample from the illumination source in rapid succession, wherein the illumination source is configured to generate incident rays of light when applied to the biological sample;
   projecting the diffraction pattern of the incident rays of light onto a sensor;
   collecting one or more diffraction patterns generated from an optical transmission function of the biological sample to reconstruct the original optical transmission function of the biological sample;
   stitching images together by matching key points across the overlapped regions of the sample images; and
   identifying one or more features of the biological sample, wherein the one or more features are selected from a group consisting of: cell count, nucleus, edges, groupings, clump size, and a combination thereof.

2. The method of claim 1, wherein the illumination source comprises an LED array.

3. The method of claim 2, wherein one or more diodes in the LED array are positioned in one or more planes.

4. The method of claim 3, wherein the one or more diodes are irregularly spaced in the one or more planes.

5. The method of claim 2, wherein one or more diodes in the LED array are arranged in one or more concentric circles.

6. The method of claim 1, further comprising:
applying light, using the illumination source, to the biological sample, from at least two point sources at an angle of 180 degrees from each other, wherein the at least two point sources are configured to generate incident rays of light when applied to the biological sample; and
collecting one or more focus maps generated from the biological sample.

7. The method of claim 1, wherein the illumination source comprises a 5×5 to 40×40 grid of point light sources.

8. The method of claim 7, wherein the array of point light sources emits electromagnetic radiation at wavelengths of 700-635 nm, 560-520 nm, 490-450 nm, and 495-570 nm.

9. The method of claim 7, wherein the point light sources illuminate the biological sample one at a time or in combination.

10. The method of claim 7, wherein the light applied by the illumination source is transmitted through the biological sample so that the diffraction pattern formed is projected onto the sensor.

11. The method of claim 10, wherein the resulting diffraction pattern is multiplexed for the detection of coherent-state decomposition.

12. The method of claim 10, wherein frequency mixing between the biological sample and the structured light shifts the high frequency biological sample information to a passband of the sensor.

13. The method of claim 1, further comprising selecting one or more of: a pattern of illumination, a frequency of illumination, a wavelength of illumination, or a combination thereof of the illumination source based on one or more features of the biological sample.

14. The method of claim 13, wherein the one or more features comprise: a sample type, a sample age, a sample application, or a combination thereof.

15. The method of claim 1, further comprising determining an adequacy of the biological sample by determining whether the biological sample comprises six clusters of ten nucleated cells.

16. The method of claim 15, wherein determining further comprises:
selecting, using a machine learning or deep learning model, one or more regions of interest based on a presence of one or more clusters; and
assessing, using the machine learning or deep learning model, the adequacy of the biological sample.

17. The method of claim 15, wherein determining further comprises:
selecting one or more regions of interest based on a presence of one or more clusters; and
classifying, using computer vision, the one or more regions of interest based on the adequacy in each region of interest.

18. The method of claim 15, wherein determining is performed by a machine learning or deep learning model trained to detect adequacy.

19. The method of claim 1, wherein the incident rays are oblique incident rays.

20. A far-field Fourier ptychographic system for assessing a biological sample, comprising:
an illumination source positioned relative to a biological sample such that the biological sample is backlit, wherein the illumination source is configured to apply light to the biological sample in rapid succession, and wherein the illumination source is configured to generate incident rays of light when applied to the biological sample;
a sensor configured to capture a plurality of images based on one or more diffraction patterns generated from an optical transmission function of the biological sample;
a lens configured to project the one or more diffraction patterns onto the sensor; and
a processor and a non-transitory computer-readable medium with instructions stored thereon, wherein the processor is arranged to execute the instructions, the processor being further arranged to:
reconstruct the original optical transmission function of the biological sample,
stitch the plurality of images together by matching key points across one more overlapping regions of the plurality of images, and
identify one or more features of the biological sample, wherein the one or more features are selected from a group consisting of: cell count, nucleus, edges, groupings, clump size, and a combination thereof.

21. The system of claim 20, wherein the illumination source comprises an LED array.

22. The system of claim 21, wherein one or more diodes in the LED array are positioned in one or more planes.

23. The system of claim 22, wherein the one or more diodes are irregularly spaced in the one or more planes.

24. The system of claim 21, wherein one or more diodes in the LED array are arranged in one or more concentric circles.

25. The system of claim 21, wherein the illumination source comprises at least two point sources at an angle of 180 degrees from each other, wherein the at least two point sources are configured to generate incident rays of light when applied to the biological sample.

26. The system of claim 25, wherein the processor is further arranged to collect one or more focus maps generated from the biological sample.

27. The system of claim 20, wherein the illumination source comprises a 5×5 to 40×40 grid of point light sources.

28. The system of claim 27, wherein the array of point light sources emits electromagnetic radiation at wavelengths of 700-635 nm, 560-520 nm, 490-450 nm, and 495-570 nm.

29. The system of claim 27 wherein the point light sources illuminate the biological sample one at a time or in combination.

30. The system of claim 27, wherein the light applied by the illumination source is transmitted through the biological sample so that the diffraction pattern formed is projected onto the sensor.

31. The system of claim 30, wherein the resulting diffraction pattern is multiplexed for the detection of coherent-state decomposition.

32. The system of claim 30, wherein frequency mixing between the biological sample and the structured light shifts the high frequency biological sample information to a passband of the sensor.

33. The system of claim 20, wherein the processor comprises more than one processor.

34. The system of claim 20, wherein the processor is further arranged to select one or more of: a pattern of illumination, a frequency of illumination, a wavelength of illumination, or a combination thereof of the illumination source based on one or more features of the biological sample.

35. The system of claim 34, wherein the one or more features comprise: a sample type, a sample age, a sample application, or a combination thereof.

36. The system of claim 20, wherein the processor is further arranged to determine an adequacy of the biological sample by determining whether the biological sample comprises six clusters of ten nucleated cells.

37. The system of claim 36, wherein the processor is further arranged to:
- select, using a machine learning or deep learning model, one or more regions of interest based on a presence of one or more clusters; and
- assess, using the machine learning or deep learning model, the adequacy of the biological sample.

38. The system of claim 36, wherein the processor is further arranged to:
- select one or more regions of interest based on a presence of one or more clusters; and
- classify, using computer vision, the one or more regions of interest based on the adequacy in each region of interest.

39. The system of claim 36, wherein the processor includes a machine learning or deep learning model trained to detect adequacy.

40. The system of claim 20, wherein the incident rays are oblique incident rays.

* * * * *

UNITED STATES PATENT AND TRADEMARK OFFICE
CERTIFICATE OF CORRECTION

| | | |
|---|---|---|
| PATENT NO. | : 11,347,046 B2 | Page 1 of 1 |
| APPLICATION NO. | : 17/415227 | |
| DATED | : May 31, 2022 | |
| INVENTOR(S) | : Rodger Michael Moore et al. | |

It is certified that error appears in the above-identified patent and that said Letters Patent is hereby corrected as shown below:

On the Title Page

Item (72) "Samatha Hastings" should be changed to -- Samantha Hastings --

Signed and Sealed this
Seventh Day of January, 2025

Derrick Brent
*Acting Director of the United States Patent and Trademark Office*